United States Patent
Hudis et al.

(10) Patent No.: US 8,881,223 B2
(45) Date of Patent: *Nov. 4, 2014

(54) ENTERPRISE SECURITY ASSESSMENT SHARING FOR OFF-PREMISE USERS USING GLOBALLY DISTRIBUTED INFRASTRUCTURE

(75) Inventors: Efim Hudis, Bellevue, WA (US); Yigal Edery, Pardesia (IL); Oleg Ananiev, Migdal Haemeq (IL); John Wohlfert, Everett, WA (US); Nir Nice, Kfar Veradim (IL)

(73) Assignee: Microsoft Corporation, Redmond, WA (US)

( * ) Notice: Subject to any disclaimer, the term of this patent is extended or adjusted under 35 U.S.C. 154(b) by 1039 days.

This patent is subject to a terminal disclaimer.

(21) Appl. No.: 12/192,111

(22) Filed: Aug. 14, 2008

(65) Prior Publication Data

US 2009/0178108 A1    Jul. 9, 2009

Related U.S. Application Data

(60) Provisional application No. 61/019,739, filed on Jan. 8, 2008.

(51) Int. Cl.
*G06F 17/00* (2006.01)
*G06Q 30/02* (2012.01)
(Continued)

(52) U.S. Cl.
CPC ............ *G06F 21/56* (2013.01); *G06Q 30/0204* (2013.01); *G06F 17/30867* (2013.01); *G06F 2221/2149* (2013.01); *H04L 63/20* (2013.01); *H04L 63/0281* (2013.01); *G06F 21/55* (2013.01); *G06F 2221/2141* (2013.01); *G06Q 30/0215* (2013.01); *G06F 2221/2151* (2013.01); *H04L 63/14* (2013.01); *G06F 2221/2115* (2013.01); *G06F 21/629* (2013.01)
USPC ........ 726/1; 726/22; 726/23; 726/24; 726/25; 709/225; 709/229

(58) Field of Classification Search
CPC ................ G06F 2221/2151; G06F 2221/2149; G06F 21/55; G06F 2221/2115; G06F 21/56; G06F 2221/2141; G06F 17/30867; G06F 21/629; H04L 63/0281; H04L 63/20; H04L 63/14; G06Q 30/0215; G06Q 30/0204
USPC ............................ 726/1, 22–25; 709/225, 229
See application file for complete search history.

(56) References Cited

U.S. PATENT DOCUMENTS 5,987,610 A * 11/1999 Franczek et al. ................ 726/24
6,052,788 A    4/2000 Wesinger et al.
(Continued)

OTHER PUBLICATIONS

"Microsoft Forefront System Security", "Introducing Stirling—Walkthroughs", Retrieved At <<http://technet.microsoft.com/en-us/library/cc441338.aspx>>, pp. 1.

(Continued)

*Primary Examiner* — Saleh Najjar
*Assistant Examiner* — Peiliang Pan
(74) *Attorney, Agent, or Firm* — Henry Gabryjelski; Kate Drakos; Micky Minhas

(57) ABSTRACT

Secure content management is enabled as a cloud-based service through which security protection and policy enforcement may be implemented for both on-premise network users and off-premise or roaming users. The global SCM service integrates the security functionalities—such as anti-virus, spyware, and phishing protection, firewall, intrusion detection, centralized management, and the like—that are typically provided by enterprise network SCM appliance hardware or servers into a cloud-based service that users reach via Internet-based points-of-presence ("POPs"). The POPs are configured with forward proxy servers, and in some implementations, caching and network acceleration components, and coupled to hubs which provide configuration management and identity management services such as active directory services.

20 Claims, 15 Drawing Sheets

(51) Int. Cl.
  *G06F 17/30* (2006.01)
  *H04L 29/06* (2006.01)
  *G06F 21/55* (2013.01)
  *G06F 21/56* (2013.01)
  *G06F 21/62* (2013.01)

(56) References Cited

U.S. PATENT DOCUMENTS

| | | | |
|---|---|---|---|
| 6,119,235 | A | 9/2000 | Vaid et al. |
| 6,182,148 | B1 | 1/2001 | Tout |
| 6,347,375 | B1 | 2/2002 | Reinert et al. |
| 6,484,203 | B1 | 11/2002 | Porras et al. |
| 6,535,227 | B1 | 3/2003 | Fox et al. |
| 6,650,890 | B1 | 11/2003 | Irlam et al. |
| 6,757,740 | B1 | 6/2004 | Parekh et al. |
| 6,760,768 | B2 | 7/2004 | Holden et al. |
| 6,789,202 | B1 | 9/2004 | Ko et al. |
| 6,871,279 | B2 | 3/2005 | Sames et al. |
| 6,920,558 | B2 | 7/2005 | Sames et al. |
| 7,003,117 | B2 | 2/2006 | Kacker et al. |
| 7,043,563 | B2 | 5/2006 | Vange et al. |
| 7,058,970 | B2 | 6/2006 | Shaw |
| 7,096,215 | B2 | 8/2006 | Bates et al. |
| 7,124,438 | B2* | 10/2006 | Judge et al. ............. 726/22 |
| 7,178,166 | B1* | 2/2007 | Taylor et al. ............ 726/25 |
| 7,221,935 | B2 | 5/2007 | Barriga-Caceres et al. |
| 7,287,271 | B1 | 10/2007 | Riggins |
| 7,318,237 | B2 | 1/2008 | Moriconi et al. |
| 7,346,923 | B2 | 3/2008 | Atkins et al. |
| 7,370,364 | B2 | 5/2008 | Dobbins et al. |
| 7,383,433 | B2 | 6/2008 | Yeager et al. |
| 7,451,488 | B2* | 11/2008 | Cooper et al. ........... 726/25 |
| 7,496,658 | B2 | 2/2009 | Southam et al. |
| 7,562,382 | B2* | 7/2009 | Hinton et al. ............ 726/2 |
| 7,594,224 | B2 | 9/2009 | Patrick et al. |
| 7,603,548 | B2 | 10/2009 | Patrick et al. |
| 7,761,923 | B2 | 7/2010 | Khuti et al. |
| 7,899,849 | B2 | 3/2011 | Chaudhry et al. |
| 2003/0005152 | A1 | 1/2003 | Diwan et al. |
| 2003/0051026 | A1 | 3/2003 | Carter et al. |
| 2003/0055994 | A1 | 3/2003 | Hermann et al. |
| 2003/0061506 | A1 | 3/2003 | Cooper et al. |
| 2003/0110392 | A1* | 6/2003 | Aucsmith et al. ........ 713/200 |
| 2004/0019656 | A1 | 1/2004 | Smith et al. |
| 2004/0064693 | A1 | 4/2004 | Pabla et al. |
| 2004/0073701 | A1* | 4/2004 | Huang et al. ............ 709/240 |
| 2004/0093419 | A1 | 5/2004 | Weihl et al. |
| 2004/0103315 | A1 | 5/2004 | Cooper et al. |
| 2004/0193691 | A1* | 9/2004 | Chang .................... 709/206 |
| 2004/0210767 | A1 | 10/2004 | Sinclair et al. |
| 2004/0254921 | A1 | 12/2004 | Cohen et al. |
| 2004/0255167 | A1 | 12/2004 | Knight |
| 2005/0010821 | A1 | 1/2005 | Cooper et al. |
| 2005/0177869 | A1 | 8/2005 | Savage et al. |
| 2005/0195854 | A1 | 9/2005 | Agmon et al. |
| 2005/0216421 | A1 | 9/2005 | Barry et al. |
| 2005/0216572 | A1 | 9/2005 | Tso et al. |
| 2006/0015645 | A1* | 1/2006 | Ocko et al. .............. 709/238 |
| 2006/0026683 | A1 | 2/2006 | Lim |
| 2006/0031938 | A1* | 2/2006 | Choi ....................... 726/25 |
| 2006/0069912 | A1 | 3/2006 | Zheng et al. |
| 2006/0075467 | A1 | 4/2006 | Sanda et al. |
| 2006/0107036 | A1 | 5/2006 | Randle et al. |
| 2007/0033641 | A1 | 2/2007 | Chu |
| 2007/0039053 | A1 | 2/2007 | Dvir |
| 2007/0067847 | A1* | 3/2007 | Wiemer et al. ........... 726/25 |
| 2007/0118879 | A1 | 5/2007 | Yeun et al. |
| 2007/0130457 | A1* | 6/2007 | Kamat et al. ............ 713/151 |
| 2007/0150934 | A1 | 6/2007 | Fiszman et al. |
| 2007/0194097 | A1 | 8/2007 | Jones et al. |
| 2007/0198432 | A1 | 8/2007 | Pitroda et al. |
| 2007/0250920 | A1 | 10/2007 | Lindsay |
| 2007/0283416 | A1 | 12/2007 | Renaud |
| 2008/0005780 | A1 | 1/2008 | Singleton |
| 2008/0028445 | A1 | 1/2008 | Dubuc et al. |
| 2008/0034425 | A1 | 2/2008 | Overcash et al. |
| 2008/0072301 | A1 | 3/2008 | Chia et al. |
| 2008/0123854 | A1 | 5/2008 | Peel et al. |
| 2008/0127333 | A1 | 5/2008 | Gabriel |
| 2008/0159313 | A1 | 7/2008 | Rasanen |
| 2008/0229385 | A1 | 9/2008 | Feder et al. |
| 2009/0019156 | A1 | 1/2009 | Mo et al. |
| 2009/0086742 | A1 | 4/2009 | Ghai et al. |
| 2010/0106599 | A1 | 4/2010 | Kohn et al. |

OTHER PUBLICATIONS

"Configuring Stirling to Work with Forefront Threat Management Gateway", Retrieved at <<http://www.google.co.in/search?hl=en&q=Configuring+Stirling+to+Work+with+Forefront+Threat+Management+Gateway&btnG=Google+Search&meta=>>, Microsoft Corporation, 2008, pp. 8.

"Comprehensive Computer Network Security Assessment", Tech Genix Ltd., Published, Oct. 16, 2002, pp. 1-12.

"White Paper", "Information Security—Network Assessment", Computer Technology Associates, Inc., Published Mar. 2002, pp. 1-11.

"HP Assessment Management Platform Software", Hewlett-Packard Development Company, Retrieved at <<https://h10078.www1.hp.com/cda/hpms/display/main/hpms_content.jsp . . . >>, Copyright 2008, p. 1.

Zitzlsberger, "Security of Content Management Systems Principles of secure Development and Administration", retrieved at <<http://cms.hs-augsburg.de/report/2004/Zitzlsberger_Georg/security_of_cms.pdf>>, Jul. 9, 2004, pp. 1-9.

"White Paper", Leveraging Two-factor Authentication to Provide Secure Access to Corporate Resources from Blackberry Devices, retrieved at <<http://www.rsaconference.com/uploadedfiles/RSA365/Security_Topics/Wireless/White_Papers/RSA/RSA_Authentication_Blackberry_Devices.pdf>>, Dec. 2006, pp. 1-8.

Hausheer, et al. "Design of a Distributed P2P-based Content Management Middleware", retrieved at <<http://www.tik.ee.ethz.ch/~mmapps.org/papers/euromicro03-camera-ready.pdf>>, Downloaded Jun. 4, 2008, pp. 1-8.

"Content Management Solutions", Retrieved at <<http://www.netrust.com/sg/products_contentmgmt.html>>, Jun. 5, 2008, pp. 1.

Burke et al, "Secure Content Management Market Definition", IDC, vol. 1, Sep. 2005, pp. 1-8.

"Policy.Net: Policy Based Network Traffic Management", Net veda LLC, 2003-2005, pp. 1-24.

"On-demand Web security service", Jan. 30, 2007, pp. 01-04, Copyright SurfControl pic.

"Global Content Management Solution", p. 01-02, http://www.rsd.com/en/global-content-management.html, Jan. 31, 2008.

* cited by examiner

ENTERPRISE SECURITY ASSESSMENT SHARING FOR OFF-PREMISE USERS USING GLOBALLY DISTRIBUTED INFRASTRUCTURE

STATEMENT OF RELATED APPLICATION

This application claims the benefit of U.S. Provisional Patent Application Ser. No. 61/019,739, filed Jan. 8, 2008, entitled "Globally Distributed Infrastructure for Secure Content Management" the disclosure of which is incorporated by reference with the same effect as if set forth at length herein.

BACKGROUND

Secure Content Management, or "SCM," is a term that is commonly used to describe the functionality provided by security products and appliances that are utilized to protect the IT (information technology) assets of an enterprise such as a business, company, or other organization. Such functionality can include, for example, filtering network traffic into and out of the enterprise for malicious code such as viruses and worms, limiting access to inappropriate external content on the Internet from inside the enterprise, and preventing attacks and other intrusions on the enterprise network. SCM can also reduce the vulnerability of the enterprise to client-side exploits, spam e-mail, and phishing schemes where valuable and/or confidential information can be stolen.

Enterprises will often implement security policies that govern asset utilization to meet their particular business needs. These policies typically cover how information in the enterprise is handled, who may access information, what kinds of information may be accessed and when that information may be accessed, permissible and impermissible behaviors, auditing practices, and the like.

SCM can generally provide excellent protection against known and unknown Internet-borne threats for IT assets that are located within the perimeter of the enterprise. However, many enterprises are increasingly utilizing mobile IT assets such as laptop computers having, for example, Wi-Fi or other network connectivity functionality. Portable computing devices like smartphones, which may support both voice and wireless data communication features such as e-mail, are also seeing widespread usage.

Existing SCM solutions typically require roaming users to connect back to their company's enterprise network in order to access the Internet. This is often impractical if the roaming user is not close to the enterprise network because of the high latency that would typically be experienced or for other reasons, such as lack of support for localization of the user experience. As a result, roaming users and other users outside the enterprise network may utilize Internet access provided by Internet service providers ("ISPs") and use public points of access such as Wi-Fi "hotspots" where security protection may not be as comprehensive as protection provided in the enterprise network. This can be a drawback to existing SCM solutions because such mobile IT assets can become vulnerable to security threats, and are not subject to the enforcement of the company's security policies when operated outside the premises of the protected enterprise network. In addition, while SCM currently provides comprehensive security solutions for business-based users, SCM solutions for the consumer market have not been developed with the same level of effectiveness.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Secure content management is enabled as a cloud-based service through which security protection and policy enforcement may be implemented for both on-premise network users and roaming users. The global SCM service integrates the security functionalities—such as anti-virus, spyware and phishing protection, firewall, intrusion detection, information leakage prevention, centralized management, and the like—that are typically provided by enterprise network SCM appliance hardware or servers into a cloud-based service that users reach via Internet-based points-of-presence ("POPs"). The POPs are configured with forward proxy servers, and in some implementations, caching and network acceleration/optimization components, and coupled to hubs which provide configuration management and identity management services such as active directory services.

The POPs can be distributed on a large scale basis to ensure that users can access the global SCM service virtually anywhere using a co-located POP. Such co-location, where the POP is relatively close to the global SCM service user, enables a high quality user experience with low network latency, while simultaneously providing for localization of the experience so that accessed resources, such as web pages, are appropriately supported in terms of language, characters sets, currency, time zone, and other localization criteria.

The global SCM service advantageously provides for securing every interaction (e.g., every "click" of a mouse or pointing device) with resources on the Internet regardless of the user's location. The same level of protection, quality of security, and security policies can be applied to all enterprise IT assets, both on-premise and mobile, in exactly the same way. In addition to extending protection beyond the boundaries of the enterprise network, in some implementations, by shifting the focus of security away from SCM appliances to one supported by a service model, the size of the vulnerability window is reduced as malware signatures may be identified and deployed to the POPs quickly. In addition, total costs of ownership can often decrease and deployment of the SCM security solution across all IT assets is simplified when utilized as a service, and bandwidth consumption on target resource servers is reduced because the global SCM service load balances users across the POPs and can also filter traffic to the servers through policy enforcement.

In various illustrative examples, the global SCM service is arranged to support consumer users who desire to use cloud-based security protection. The global SCM service can protect the consumer's networkable computing devices that may be located in the home, outside the home while roaming, for example at a Wi-Fi hotspot at a public library or shopping center, or outside the home when a family member takes a laptop away to college. In all these scenarios, user preferences, parental controls, and other options can be maintained by the global SCM service, irrespective of where the devices are located, much like policies in a business setting can be enforced. In addition, the global SCM service provides comprehensive security protection against malware, hackers, and other threats.

A secure search service may be supported by the global SCM service. In this example, the service can check or clean links to the web pages returned as search results to frustrate hackers or spammers who artificially boost rankings of their sites in an attempt to draw users to them.

In cases where a user experience with an Internet-based resource such as a website requires a particular resource that a user does not have on the user's local IT device or may be prohibited from using it locally due to policy restrictions, the global SCM service can provide the resource on a POP. For example, a user may not have a current version of a needed word processing application on the user's local laptop computer, or policy prevents a word processing document from opening on the laptop due to concerns for macro viruses. The global SCM may be arranged to open the document at the POP and render the user interface to the document using a Microsoft Terminal Services session, HTTP (HyperText Transfer Protocol) rendering, or other remote application deployment.

The global SCM service may implement an enterprise security assessment sharing ("ESAS") arrangement in which a semantic abstraction, called a security assessment, is created to enable sharing of security-related information among different ESAS-enabled security endpoints in a POP, or among ESAS-enabled endpoints in different POPs that are deployed with the SCM service. The security assessments existing in the environment function to provide a security context that gives an ESAS-enabled endpoint with a new way to look at its own locally-available information. The security context enables an ESAS-enabled endpoint to combine or correlate evidence from security assessments received from a variety of different sources, and across object types, in order to significantly enhance the quality of its detection of potential security incidents and reduces the level of false-positive and false-negative identifications of security incidents in the enterprise network. The global SCM service can thus extend the advantages and benefits of ESAS to users who are outside the enterprise network (i.e., roaming or off-premise users) while also increasing the number of ESAS-enabled endpoints that are available to detect potential security threats.

In addition to security functionality, the global SCM service may be arranged to enable users to select a user-profiling feature where user clicks captured by SCM service enable the generation of user profile. User-specific (or profile-specific) content or processes may then be selected and provided to the user based on the profile to provide an enhanced user experience and/or more relevant information.

The global SCM service may be provided under a variety of business models. For businesses, the global SCM service may be included in the purchase price of on-premise security solutions, or provided as attached service which complements the on-premise solution, typically on a subscription basis. For consumer users, the global SCM service may be integrated as a complementary offering to bundled security services that typically provide anti-virus, anti-spyware, and firewall protection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements in the drawings are not drawn to scale unless otherwise indicated.

DETAILED DESCRIPTION

Figure 1:
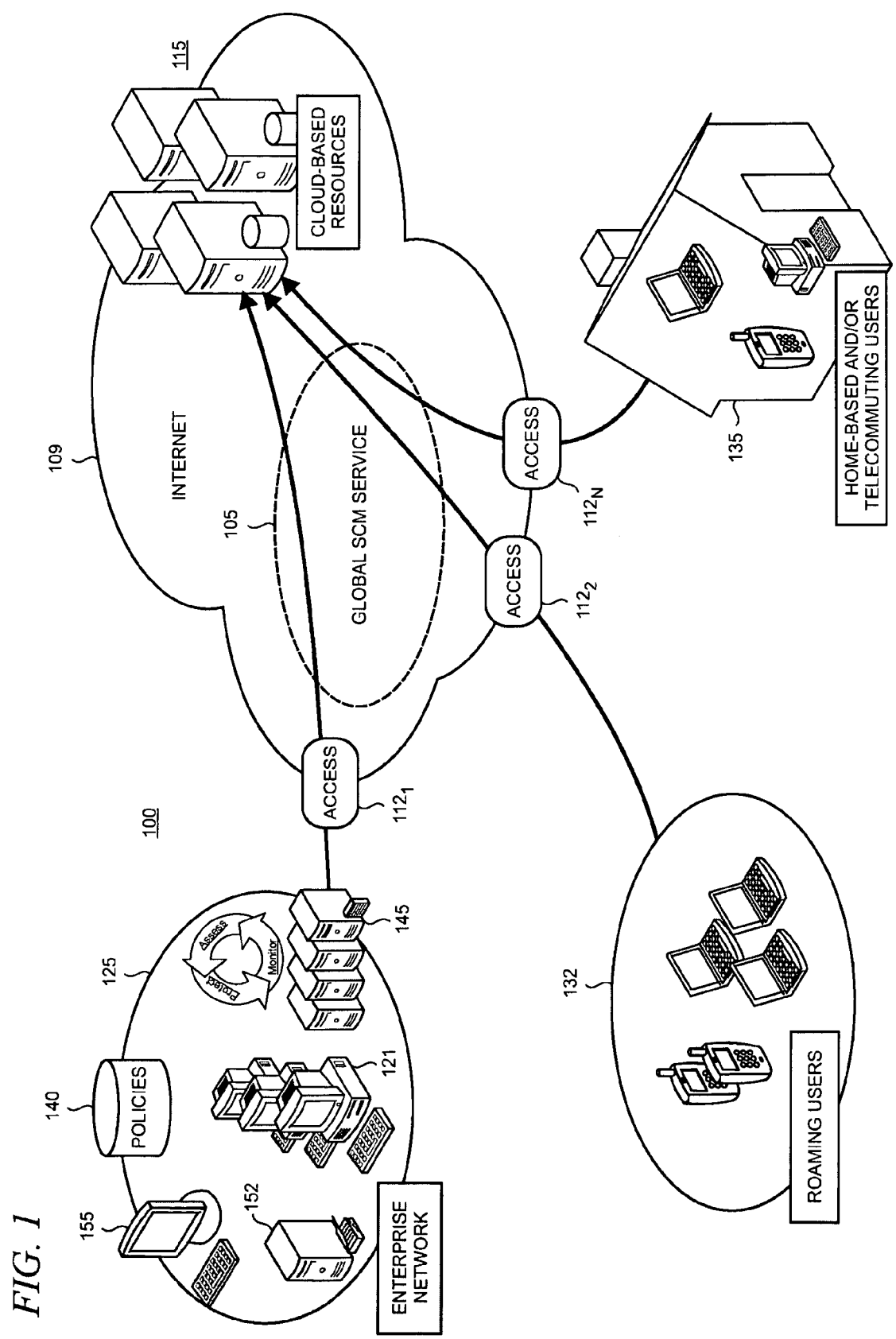
FIG. 1 shows an illustrative business-computing environment in which the present global SCM service may operate.

FIG. 1 shows an illustrative business-computing environment 100 in which the present global SCM service 105 may operate. In this example, the global SCM service 105 is provided using a "cloud-based" service paradigm. Here, the cloud is implemented as a network of services and connections that exist on the Internet 109. Cloud-based services are anticipated to grow as a source of distributed and programmable services that may provide significant data, resources, software and functionality to users over publically accessible networks such as the Internet. Cloud-based services can be expected to provide significant benefits to users as the service operator can often provide a desired functionality more efficiently and at lower costs through specialization and economy of scale. In addition, by receiving a feature or function as a service, significant responsibilities for IT infrastructure, including acquisition, maintenance, and upgrades, can usually be shifted from a business organization or consumer to the service provider.

Figure 3:
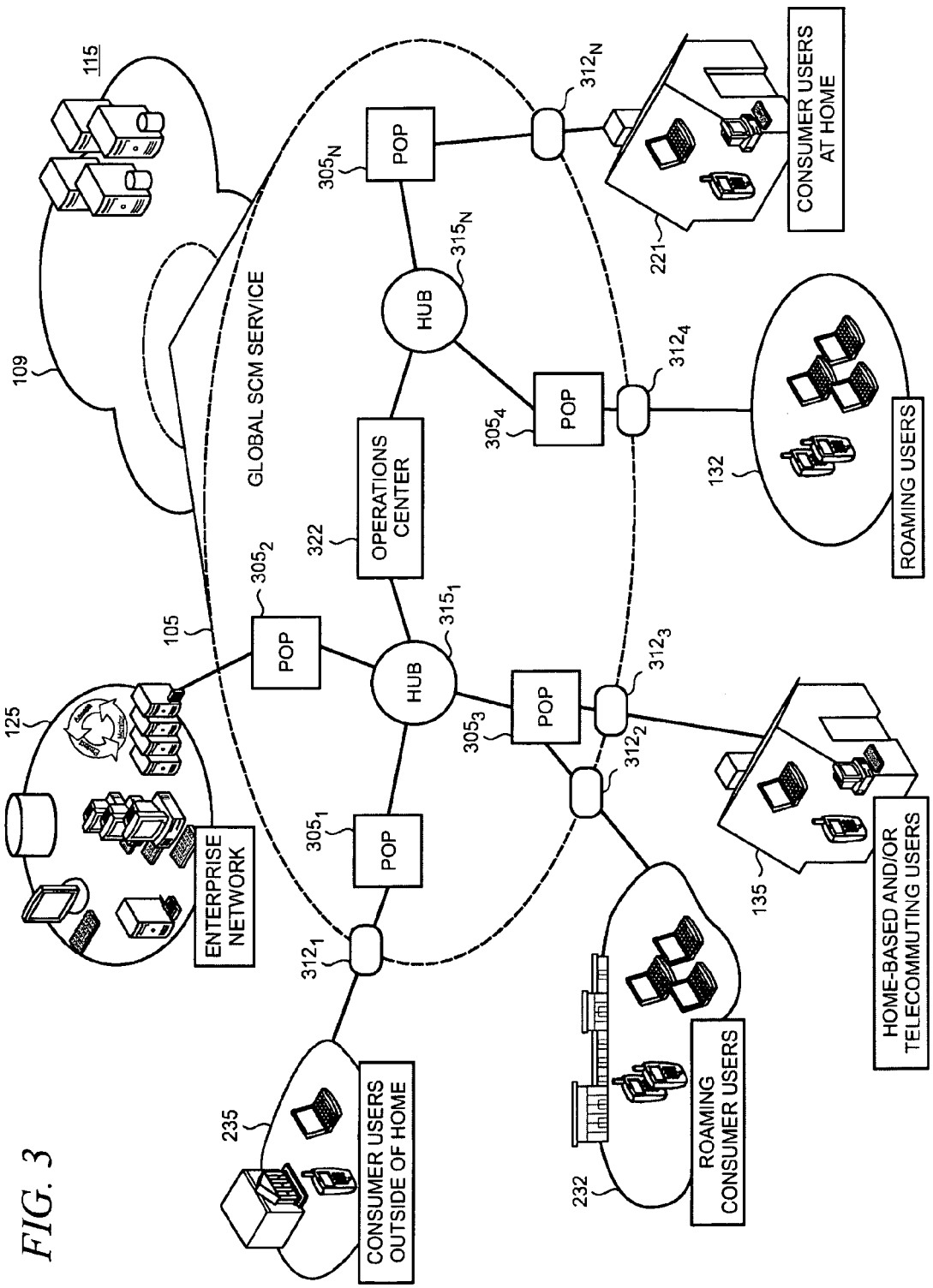
FIG. 3 shows a physical architecture of an illustrative global SCM service which is configured to use a plurality of points-of-presence, hubs, and an operations center.
Figure 4:
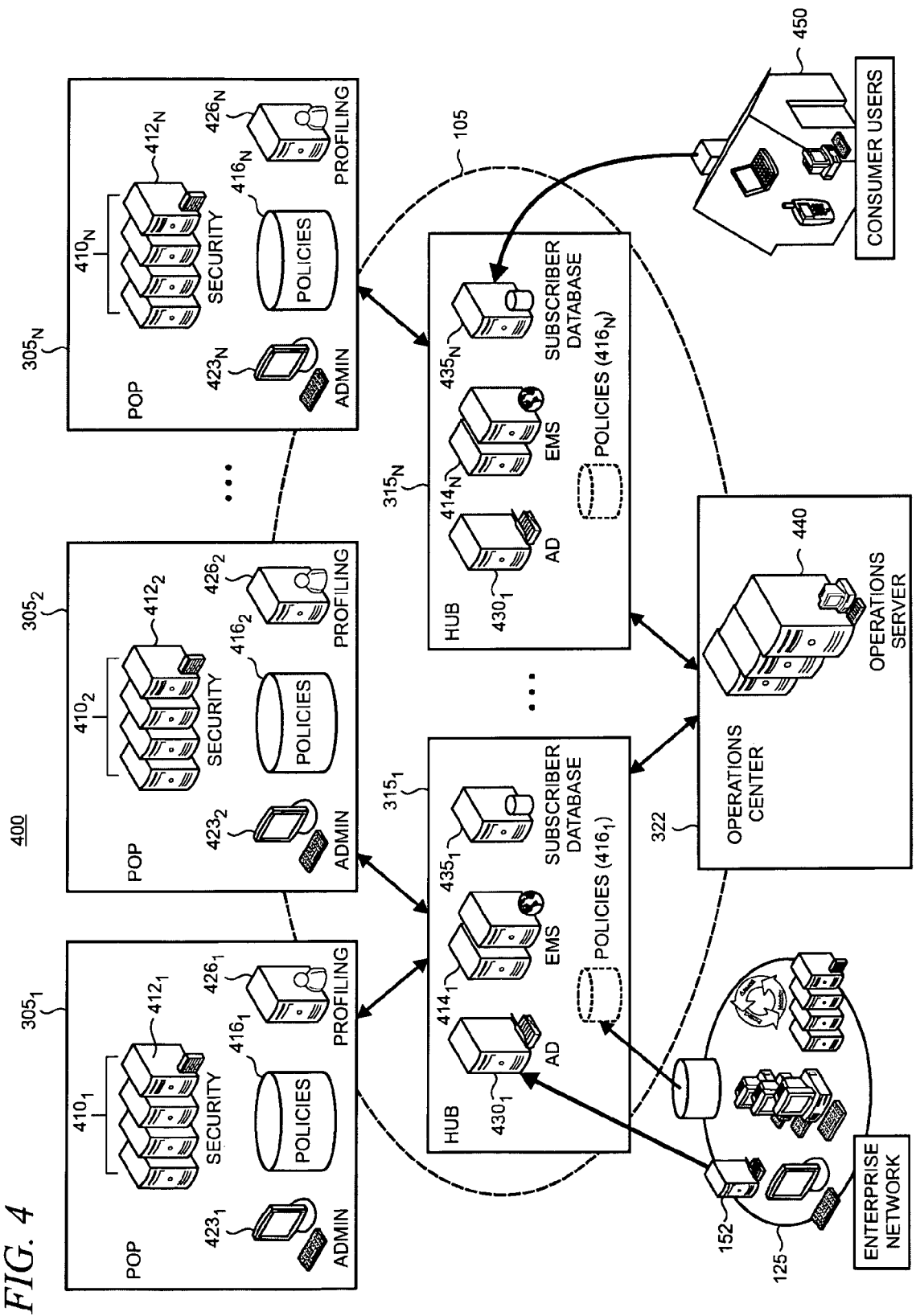
FIG. 4 shows an illustrative logical architecture for the global SCM service.

The global SCM service 105 is described in more detail in the text accompanying FIGS. 3 and 4.

Clients to the global SCM service 105 establish access, as indicated by reference numerals $112_{1, 2 \ldots N}$, to the Internet 109 in order to interact with cloud-based resources 115. These cloud-based resources 115 may include, for example, websites, FTP (file transfer protocol) sites, databases, libraries, and the like. As shown in FIG. 1, this interaction is facilitated by the global SCM service 105.

In this illustrative business-computing environment 100, three sets of business-oriented users are shown: users 121 in an enterprise network 125 that generally use fixed IT assets; roaming users 132 using mobile IT assets; and, home-based and/or telecommuting users 135 that can use both fixed and mobile IT assets. The fixed IT assets typically include personal computers ("PCs"), hosts, workstations, and servers. Mobile IT assets may include networkable devices such as laptop PCs, pocket PCs, handheld computers, smartphones, portable e-mail clients like Research In Motion's Blackberry devices, mobile phones, PDAs (personal data assistants), and the like.

Enterprise network users 121 are subject to security policies 140 which govern the utilization of assets in the enterprise network 125. In particular, the security policies 140 are typically enforced, at least in part, by one or more security appliances 145 which are also commonly called security gateways which function as network "endpoints" that operate within the enterprise network 125. The security policies typically govern which users may access information, what kinds of information may be accessed and when, permissible and impermissible behaviors, auditing practices in the enterprise, etc.

The appliances 145 may include, for example, security products that monitor, assess, and take action with respect to different parts of security-related data within the enterprise. For example, the enterprise network 125 may utilize a combination of security products such as a product that protects host computers in the enterprise, an edge firewall product, a network intrusion detection system ("NIDS") product, a network access protection ("NAP") product, one or more specialized line-of-business security gateways, information leakage protection gateways, and other discrete security products in order to provide security for the various different parts of the enterprise network 125.

A commercial example of the host security product is the Microsoft Threat Management Gateway ("TMG") product which provides unified malware protection for the enterprise's desktops, laptops, and server operating systems. An edge firewall is a security product that is arranged to protect the enterprise network 125 from Internet-based threats while providing users with remote access to applications and data. The edge firewall may be embodied by, for example, a Microsoft Internet Security and Acceleration® ("ISA") server. The NAP security product performs computer health policy validation by ensuring ongoing compliance with health policies defined by an administrator. Typically, access is restricted for computers monitored by the NAP security product that do not comply with system health requirements. The NIDS security product analyzes traffic. The NIDS security product operates to detect malicious activity such as denial of service attacks port scans by monitoring network traffic inside the enterprise network 125. The line-of-business security products protect various line-of-business applications including, for example, an e-mail application such as Microsoft Exchange® that is used in the enterprise to provide anti-virus and anti-spam protection.

Other security appliances 145 that may typically be utilized in the enterprise network 125 include web application protection products, UTM (Unified Threat Management) products, SEM/SIM (Security Event Management/Security Incident Management) products, and operational heath monitoring and configuration management products (e.g., Microsoft Windows® Software Update Services).

Also operating in the enterprise network 125 are an identity management server 152 (e.g., Microsoft Active Directory) and an operations management console 155. The operations management console 155 may be implemented, for example, using the Microsoft Operations Manager ("MOM") to provide event-driven operations monitoring, performance tracking, security policy enforcement, and auditing capabilities. In many implementations the operations management console 155 will be connected to a corresponding functionality that is based in the global SCM service to enable a unified management experience that extends across the local and cloud-based security functionalities.

In the present global SCM service arrangement, the security functionality provided by the security appliances 145 may be supplemented or replaced by security functionality enabled through the global SCM service 105. The particular balance between local and cloud-based security functionality for a given enterprise network can be selected to meet the needs of that particular implementation.

Figure 2:
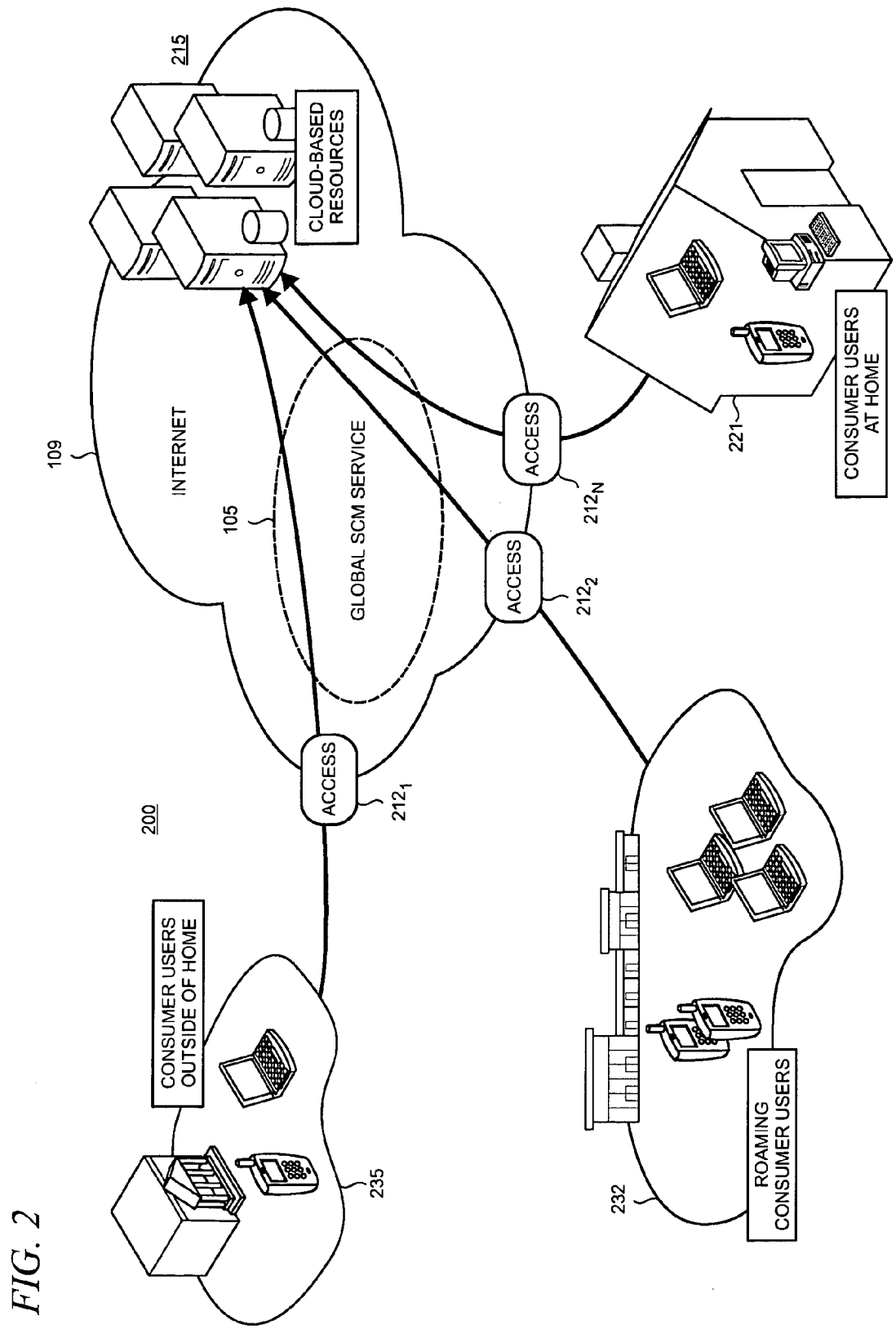
FIG. 2 shows an illustrative consumer-computing environment in which the present global SCM service may operate.

FIG. 2 shows an illustrative consumer-computing environment 200 in which the present global SCM service 105 may operate. There are three sets of consumer users in this example who seek to access, as indicated by reference numerals $212_{1, 2 \ldots N}$, cloud-based resources 215 such as websites on the Internet 109, consumer users 221 at home using fixed and mobile IT devices such as PCs, laptops, and smartphones; roaming consumer users 232 who may wish, for example, to surf the Internet to compare online pricing for a particular product while shopping at a shopping center; and consumer users outside of the home 235 such as students who are using a family's laptop or smartphone while at a school or library.

Currently, consumer users typically use host-based security applications such as PC-based firewalls and anti-virus products to provide security protection rather than rely on dedicated security appliances or endpoints that are commonly used in the business-computing environment 100 (FIG. 1). By comparison, in the present consumer-computing environment 200 shown in FIG. 2, such host-based security may be supplemented or replaced by security protection that is provided via the global SCM service 105.

As shown in FIG. 3, the global SCM service 105 is configured with a multiplicity of POPs $305_{1, 2 \ldots N}$ that are distributed, in this example, over a comparatively large geographic area. As noted above, and described in more detail below in the text accompanying FIG. 4, each POP 305 integrates the security functionalities that are typically provided by the SCM appliances 145 in the enterprise network 125 into a cloud-based service. Using a multiplicity of POPs 305 in such a distribution enables diversely-located users of the service to be served by a POP that is substantially co-located. The term "co-location" as used here means that a given POP is close enough to the user to provide a degree of optimization of network operations, to minimize latency for example, while also providing for appropriate localization of the user experience.

In this example, the global SCM service 105 is configured to serve multiple users and user types, including both the business-based and consumer users shown respectively in FIGS. 1 and 2. In alternative configurations, it may be desirable to have SCM service 105 serve only a specific user type, or otherwise be tailored to that user type. Users reach the global SCM service 105 by accessing the Internet 109, as indicated by reference numerals $312_{1, 2 \ldots N}$.

In most implementations of the present global SCM service two or more POPs 305 will be distributed over an area or region that is large enough that a single POP would not provide satisfactory network performance or localization.

That is, as the distance to a POP increases, network latency typically increases. In addition, as each POP uses forward proxy servers, it can become difficult to maintain appropriate localization of the user experience when, for example, a user is located in one country while the POP is located in another. Accordingly, the term "global" as used here refers to multiple POPs 305 that are distributed to serve multiple local areas. However, the term does not necessarily imply worldwide or unlimited coverage in all implementations. The size of the footprint for the distribution of POPs 305, the number of POPs utilized, and their geographic location may vary to meet the requirements of a particular implementation.

The POPs 305 are backed by hubs $315_{1 \ldots N}$ that provide additional functionality and support for the global SCM service 105. Typically, the hubs 315 will be deployed in fewer numbers compared with the POPs 305 so that each hub will support multiple POPs. While the precise ratio of POPs to hubs can be expected to vary according to the needs of a specific implementation, in a typical large-scale roll out, if hundreds of POPs are utilized, then perhaps dozens of hubs could be deployed. An operations center 322 is also utilized in the global SCM service 105. While a single operations center is shown in FIG. 1, this is merely illustrative, as more than one operations center may be utilized depending upon the requirements of a specific application of the present arrangement.

FIG. 4 is a logical architecture 400 for the global SCM service 105 that shows details of the POPs 305, hubs 315, and operations center 322. Each POP 305 supporting the global SCM service 105 is typically configured to include a suite of security appliances or products $410_{1, 2 \ldots N}$. While the particular mix of security products 410 can vary by implementation, typically they will replicate the security functionality provided by similar products that are deployable in an enterprise network (e.g., enterprise network 125). For example, the security products 410 may include a host security product (e.g., a TMG gateway), an edge firewall, a NIDS product, a NAP product, and one or more specialized security products for typical line of business applications such as e-mail. In addition, UTM, SEM/SIM, information leakage prevention, and operational health monitoring and configuration management products may also be utilized where required. Although most POPs 305 will be similarly configured, there is no requirement that the identical mix of security products 410 be utilized in each and every POP.

In this example, each POP 305 includes a Microsoft ISA server 412 that provides integrated firewall, forward proxy, and network performance enhancement features. The firewall function includes, for example, HTTP application layer filtering to govern HTTP inbound and outbound access to the cloud-based resources 115 (FIG. 1) according to rules or policies, as described below. URL (Universal Resource Locator) filtering and anti-virus functions may also be directly supported in the firewall. As a forward proxy, the ISA server 412 stands in the way of the Internet 109 and receives data from users bound for the Internet 109 and forwards it on their behalf. The network performance features of the ISA servers 412 include, among others, object caching, HTTP compression to eliminate redundant data during transmission of HTTP packets, and packet prioritization using quality of service ("QoS") enforcement methodologies. Configuration and management information for the ISA servers 412 are stored in the enterprise management system ("EMS") servers $414_{1 \ldots N}$ in the hubs 315.

POPs 305 are also configured to include policy databases $416_{1, 2 \ldots N}$ which contain security policies that govern access to, and interaction with, cloud-based resources by users of the global SCM service 105. In accordance with the present cloud-based service paradigm, the policies can be tailored to specific users, and groups of users. Thus, for example, a company operating IT assets in the business-computing environment 100 shown in FIG. 1 can duplicate its policies from its own enterprise network 125 onto the Internet cloud 109 via the global SCM service 105. The duplicated polices would then be enforced, for example, for roaming users 132 and home-based and/or telecommuting users 135 when they access the cloud-based resources 115 when outside the perimeter of the enterprise network 125. In an alternative configuration, the policy databases 416, or portions thereof, may be centralized within one or more of the hubs 315, as indicated by the dashed lines. The policies in databases 416 may also be managed by the EMS servers 414 in the hubs. However, the POPs 305 will generally be configured to replicate all functionality necessary to implement security and policy enforcement in case a connection to a hub 315 is broken.

In this example, operations management consoles $423_{1, 2 \ldots N}$ are supported in the POPs 305. The functions provided by the consoles 423 are essentially similar to those provided by their counterparts in the enterprise network 125. Operation management consoles 423 enable the security products 410 and policies 416 in a POP 305 to be configured, monitored, and audited according to an enterprise network administrator's instructions or service agreement with the enterprise. While supported in the POPs 305, the operations management consoles 423 can typically be expected to be operated from the hubs 315. In some implementations, the operations management consoles 423 will either be solely deployed in the hubs, or replicated in the hubs so that the operations management functionality is replicated in both the POPs 305 and the hubs 315. As noted above, the operations management console functionalities can be extended and unified to enable administrative functions to be performed on remote devices as if they were co-located on the premises of a given enterprise.

In some implementations, the operations management functionalities, or subsets thereof, can be configured for remote access by administrators. In other implementations, operations management functionalities in the POPs 305 are reserved for use by global SCM service provider personnel.

User-profiling $426_{1, 2 \ldots N}$ functions are also supported in the POPs 305. User-profiling 426 is described in more detail below in the text accompanying FIG. 15.

Hubs $315_{1 \ldots N}$ may include active directory servers $430_{1 \ldots N}$ or other types of identity stores that support respective Active Directory and other identity management services for managing identities and relationships for users in the business-computing environment 100 shown in FIG. 1. The Active Directory service enables, for example, user authorization and authentication, as well as single sign-on capabilities for cross-domain resource access. Typically, Active Directory data will be synchronized with the Active Directory server 152 in the enterprise network 125 to a hub 315. In this case, synchronization between the servers can be implemented using a one-way or two-way trust arrangement to enable policies and reports, for example, to be expressed using the same user name and groups.

Active Directory services may also be utilized to support authentication and authorization for users in the consumer computing environment 200 shown in FIG. 2 who use or subscribe to the global SCM service 105. Alternatively, user and/or subscription information may be supported in subscriber databases $435_{1 \ldots N}$ in the hubs 315 as required to implement identity management for the consumer users 450 of the global SCM service 105 using for example, the Microsoft Live ID service (formerly known as Microsoft .NET Passport), or federated identification services.

The hubs 315 are supported by the operations center 322 which contains one or more operations servers 440 to facilitate the overall configuration, management, and monitoring of the global SCM service 105 from a central location.

Figure 5:
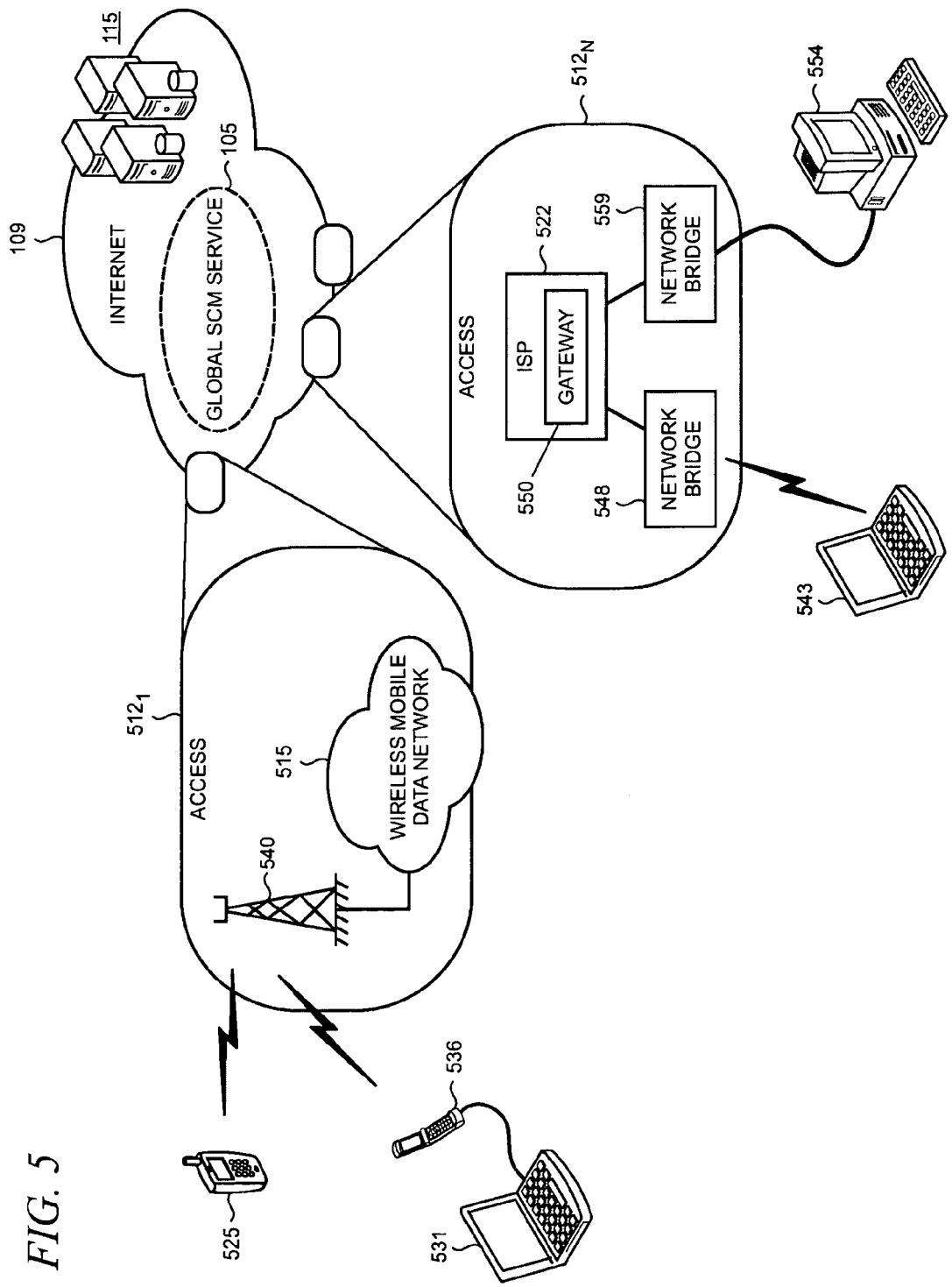
FIG. 5 shows details of illustrative access arrangements by which global SCM service client devices access the global SCM service.

FIG. 5 shows details of an illustrative access arrangement by which global SCM service client devices access the global SCM service 105. Two illustrative arrangements are shown: one in which mobile device users access the Internet 109 using a wireless mobile data network 515; and, the second in which Internet access is facilitated by an ISP 522. The methods are generally applicable to both users in the business-computing environment 100 and consumer-computing environment 200.

In the first arrangement, roaming users are respectively using a smartphone 525 and laptop 531 that uses an intermediate device such as a wireless PC card or mobile phone 536, as shown, as a modem. The wireless mobile data network could be, for example, one of GPRS (General Packet Radio Service), EVDO (Evolution Data Optimized), or UMTS (Universal Mobile Telecommunications System). The devices wirelessly connect through a nearby cell tower 540 to the data network 515 to establish access to the Internet 109 as indicated by reference numeral $512_1$.

In the second arrangement, a roaming laptop user 543 establishes Internet access, as indicated by reference numeral $512_N$, through a public Wi-Fi hotspot which provides a network bridge 548 to a network gateway 550 operated by the ISP 522. A home-based PC user 554 on a local area network running Ethernet, for example, makes an Internet connection through a network bridge 559 like a cable modem or DSL (digital subscriber line) connection to the ISP gateway 550. Although a single ISP and gateway are shown in FIG. 5, it is noted that the present global SCM service can work with any form of Internet access that a particular IT device or user employs. Accordingly, multiple different ISPs can be utilized depending on the requirements of a given implementation. ISPs commonly provide Internet access to both consumers and businesses, although the equipment, connection type, and service agreements for the service will typically vary.

Figure 6:
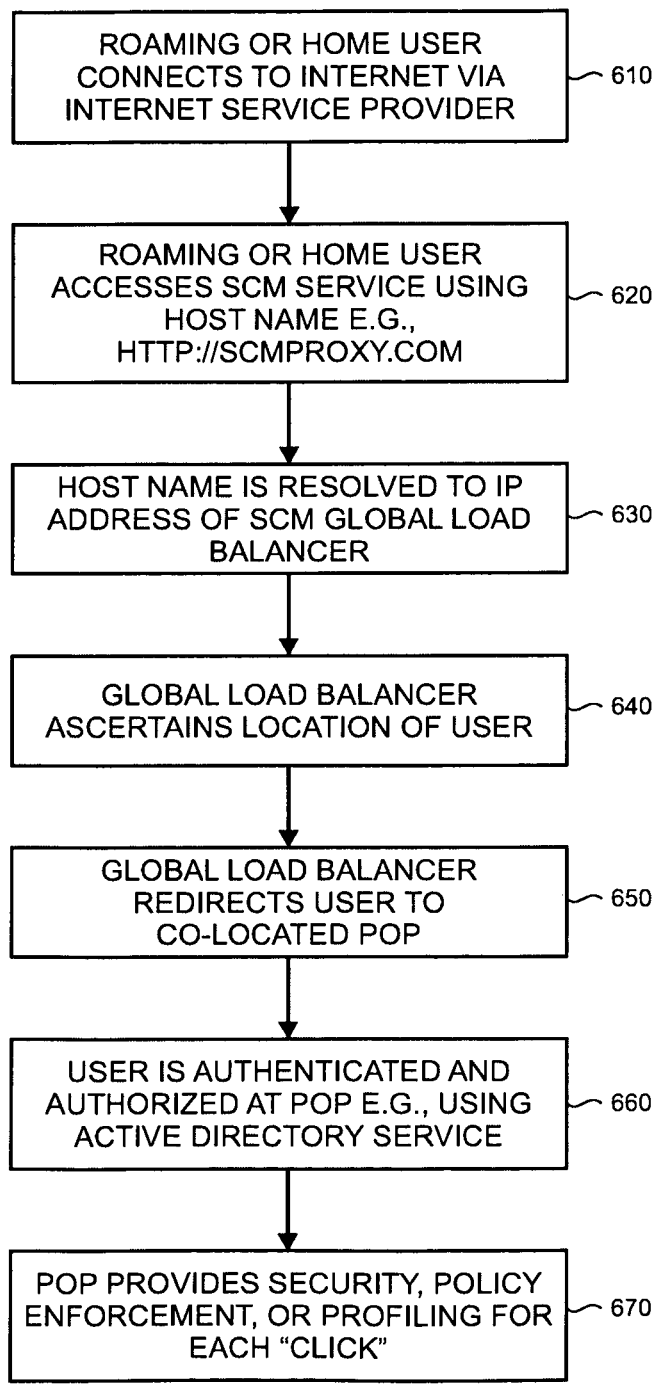
FIG. 6 is a flowchart of an illustrative method by which global SCM service client devices access the global SCM service.

As shown in the flowchart shown in FIG. 6, in both access arrangements shown in FIG. 5, once an Internet connection is established (610), a user may access the global SCM service 105 by pre-provisioning unified host name, for example HTTP://scmproxy.com (620). This host name is resolved, using a DNS (Domain Name System) lookup, to an IP (Internet Protocol) address (630) for a global load balancer (not shown in the drawings). The global load balancer ascertains the geographical location of the user (640) SO that the user may be redirected (650) to the an appropriate POP 305 (FIG. 3). It is noted that location may be one of several factors that may be utilized in determining to which particular POP a user is redirected. For example, restrictions imposed by licensing and other commercial considerations, security consideration, and other factors may also be used in various implementations.

The location of the user may be determined in a variety of different ways. For users who gain Internet access using the wireless mobile data network 515 in FIG. 5, the location of the user can be determined by coordinates of the cell tower 540. Alternatively, some mobile devices are equipped with GPS (Global Positioning System) features which can also be utilized to identify the location of a user.

For users gaining access using an ISP, a number of techniques exist for identifying a geographical location of the user based on IP address supplied by the ISP. Typically, a geographical location at the country or region level may be readily determined by mapping the IP address to locations contained in a geo-location database. While location may be resolved with even more specificity (e.g., to the city or ISP), location accuracy typically falls off, and not all geo-location databases are complete and reliable for all locations in the world. However, accuracy is typically sufficient to redirect the user to a co-located POP 305 for purposes of network optimization and localization.

Another technique for locating a user based on IP address uses the LOC record for an ISP's server as described in RFC 1876 (Request for Comment by the Internet Engineering Task Force, or "IETF"). More particularly, location information of a server, including latitude and longitude is often placed on the DNS registration page. By performing a reverse DNS lookup, a server associated with a given IP address can be determined and the LOC record for that server retrieved. While not all servers have LOC records, this technique may still be useful in some implementations or to supplement other IP address geo-location techniques. However, it is noted that such techniques are intended to be illustrative and that other techniques and methods may also be used depending on the requirements of a particular implementation.

Once redirected to an appropriate POP, the user is authenticated and authorized, for example using the Active Directory service (660), as described above, or via a Live ID service or federated identity management service. The user may then take advantage of the features and functionalities provided by the global SCM service 105 including, for example, security, policy enforcement, and profiling which can be applied to every user interaction or "click" on the cloud-based resources 115 shown in FIG. 1 (670).

An illustrative example in which an ESAS arrangement is implemented using the present global SCM service is now presented. In an enterprise computing environment, for example, an office of a business, a number of personal computers, workstations, servers and the like, along with other devices such as mass storage subsystems, internal network interfaces, and external network interfaces, are typically interconnected to provide an integrated environment in which information may be generated, accessed from external sources, and shared among various users. Commonly, users perform a variety of operations including order receipt, manufacturing, shipping, billing, inventory control, document preparation and management, e-mail, web browsing, and other operations in which creation, access, and sharing of data is beneficial.

Currently, security is typically provided for an enterprise using a variety of different security products (e.g., security products 145 in FIG. 1) that are each normally arranged to monitor only a partial portion of enterprise-wide data. That is, security products are arranged as separate local "islands" where each product monitors, assesses, and takes action with respect to different parts of the data within the enterprise. For example, the host security product, edge firewall product, NIDS product, NAP product, and other discrete security products typically provide security for the various different parts of the enterprise.

While these security products often perform satisfactorily in many applications, detection of security incidents often suffers from undesirably high levels of false-positive and false-negative occurrences as a result of the monitoring of only partial enterprise security data. It has also been difficult to provide effective common management across all the enterprise security product islands. Current attempts to correlate enterprise-wide security data have high management and maintenance costs and have problems in scaling. Accordingly, ESAS provides a single enterprise-wide view to enable security administrators to define and enforce clear, simple, and unified enterprise-wide policies for automatic responses to security incidents.

As noted in the Summary section above, ESAS relies upon a semantic abstraction, called a security assessment that enables sharing of security-related information between different security products, called endpoints, in an enterprise security environment. A security assessment is defined as a tentative assignment by an endpoint of broader contextual meaning to information (i.e., data in some context) that is collected about an object of interest in the environment such as a computer, user, service (e.g., a website), data, or the enterprise as a whole. The security assessment utilizes a concise vocabulary for an endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the endpoint has in its assignment of contextual meaning, and a time-to-live ("TTL") field which reflects the endpoint's estimate of the time period for which the security assessment is expected to be valid. Thus, for example, a security assessment may be used by an endpoint to declare, in light of that endpoint's current understanding of one or more security incidents, that a particular machine is compromised, with a critical level of severity, with medium fidelity, and having a TTL of 30 minutes. A variety of types of security assessments may be used in any given enterprise security environment having, for example, various combinations of assessment category and object type.

Endpoints are enabled with functionality to publish security assessments onto a security assessment channel operating in the environment, as well as subscribe to a subset of available security assessments published by other endpoints. The security assessments existing in the environment that are active (i.e., those having a TTL which indicates the assessments are still valid) function to provide a security context that gives such ESAS-enabled endpoint a new way to look at its own locally-available information. That is, the security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate for each type of security assessment (whether received from another endpoint or internally generated by the endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). ESAS-enabled endpoints are further arranged to roll-back the local action upon expiration of the security assessment that prompted the local action (i.e., when the security assessment exceeds the time-to-live specified in the TTL field).

In most typical ESAS implementations, a specialized endpoint called an ESAS central server is utilized. The ESAS central server is coupled to the security assessment channel and performs as a centralized audit point by subscribing to all security assessments, logging the security assessments, and also logging the local actions taken by endpoints in response to security incidents in the environment. The ESAS central server provides administrators with a comprehensive view of the history and current status of the enterprise as a whole and of each ESAS-enabled endpoint. The utilization of the security assessments enables an administrator to compactly and efficiently configure response policies to incidents that are detected across the entire enterprise. The security assessments function as natural anchors, or starting points, to define enterprise-wide security response policies. A streamlined and consistent management interface is thus enabled to define the desired responses for each type of security assessment across the entire enterprise.

The ESAS arrangement provides a number of advantages. By employing a security assessment having a concise vocabulary, overall data complexity in the enterprise is drastically reduced and only meaningful information is shared between endpoints. Use of the security assessment also eliminates the need to collect large amounts of raw data in a central storage location, and thereby enables highly scalable enterprise security solutions to be built on a very cost effective basis. In addition, a new endpoint may be readily deployed with on-demand extensibility. Security assessments may be shared between the new endpoint and existing endpoints without the need to reconfigure any of the response policies within existing endpoints. The new endpoint simply functions as a new source of security assessments using a semantic abstraction that the existing endpoints already understand. The utilization of security assessments also enables enterprise-wide security policies to be established using a very compact and clear methodology, without needing to understand all of the possible security events that every endpoint may generate in the enterprise, and then try to describe the responsive action for each event.

Figure 7:
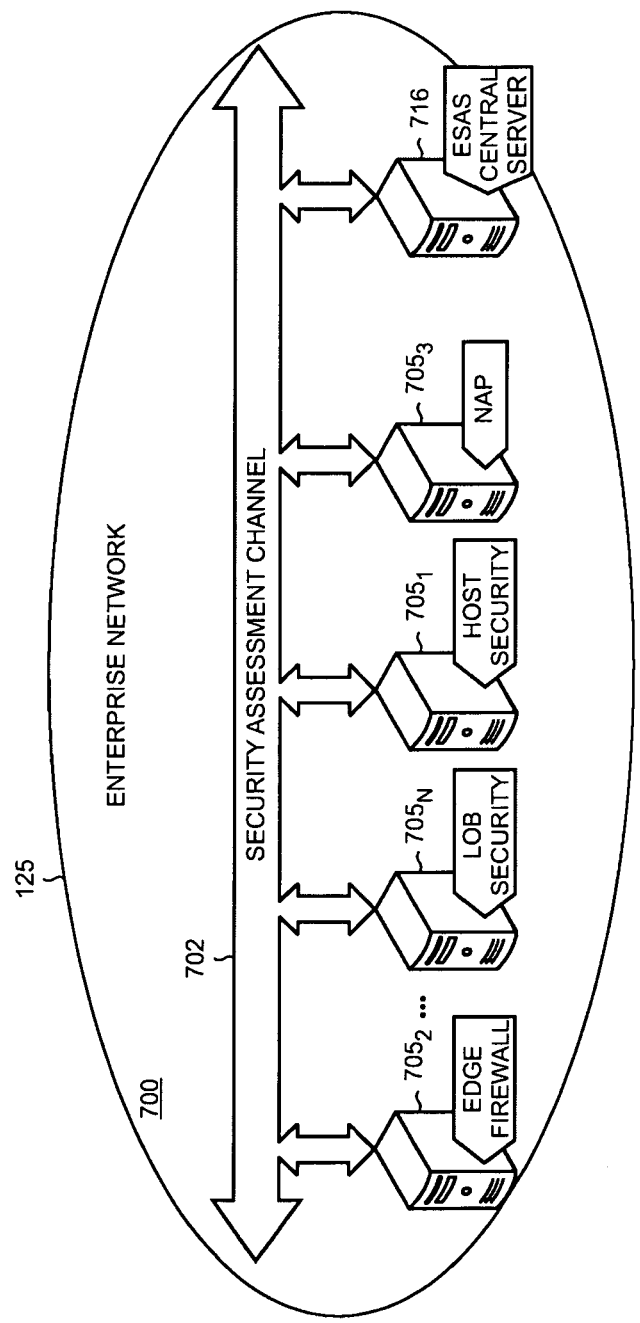
FIG. 7 shows an illustrative enterprise security assessment sharing ("ESAS") arrangement in an enterprise network.

Turning now to FIG. 7, an illustrative ESAS arrangement 700 deployed in the enterprise network 125 is shown in which a security assessment channel 702 is provided to enable a security assessment to be shared among multiple endpoints using a language/protocol that is commonly-utilized at each endpoint. The security assessment channel 702 facilitates a publish/subscribe model used by the endpoints for connecting the sources of security assessments (publishers) to the consumers of the security assessments (subscribers). As shown, both the publishers and subscribers on the security assessment channel 702 are endpoints 705.

The endpoints 705 are isolated from the mechanics of the actual transport and management of the publish/subscribe model through a semantic abstraction layer that is arranged to simplify interactions with the security assessment channel 702. The abstraction layer comprises tables describing the security assessment types to which the endpoints subscribe, and tables describing the security assessment types that endpoints publish (as described below, not all endpoints generally subscribe to all security assessment types). In addition, the abstraction layer provides an API (application programming interface) for reading received security assessments, and an API for generating security assessments.

A specialized endpoint, ESAS central server 716, is coupled to the security assessment channel 702 and performs as a centralized audit point for the ESAS arrangement 700. Accordingly, the ESAS central server 716 subscribes to all security assessments and permanently logs them. ESAS central server 716 also receives and logs messages from the endpoints that indicate the local actions that are taken by an endpoint. The ESAS central server 716 thus provides administrators with security assessment monitoring functionality that gives a comprehensive view of the history and current status of the enterprise as a whole, and each ESAS-enabled endpoint.

Figure 8:
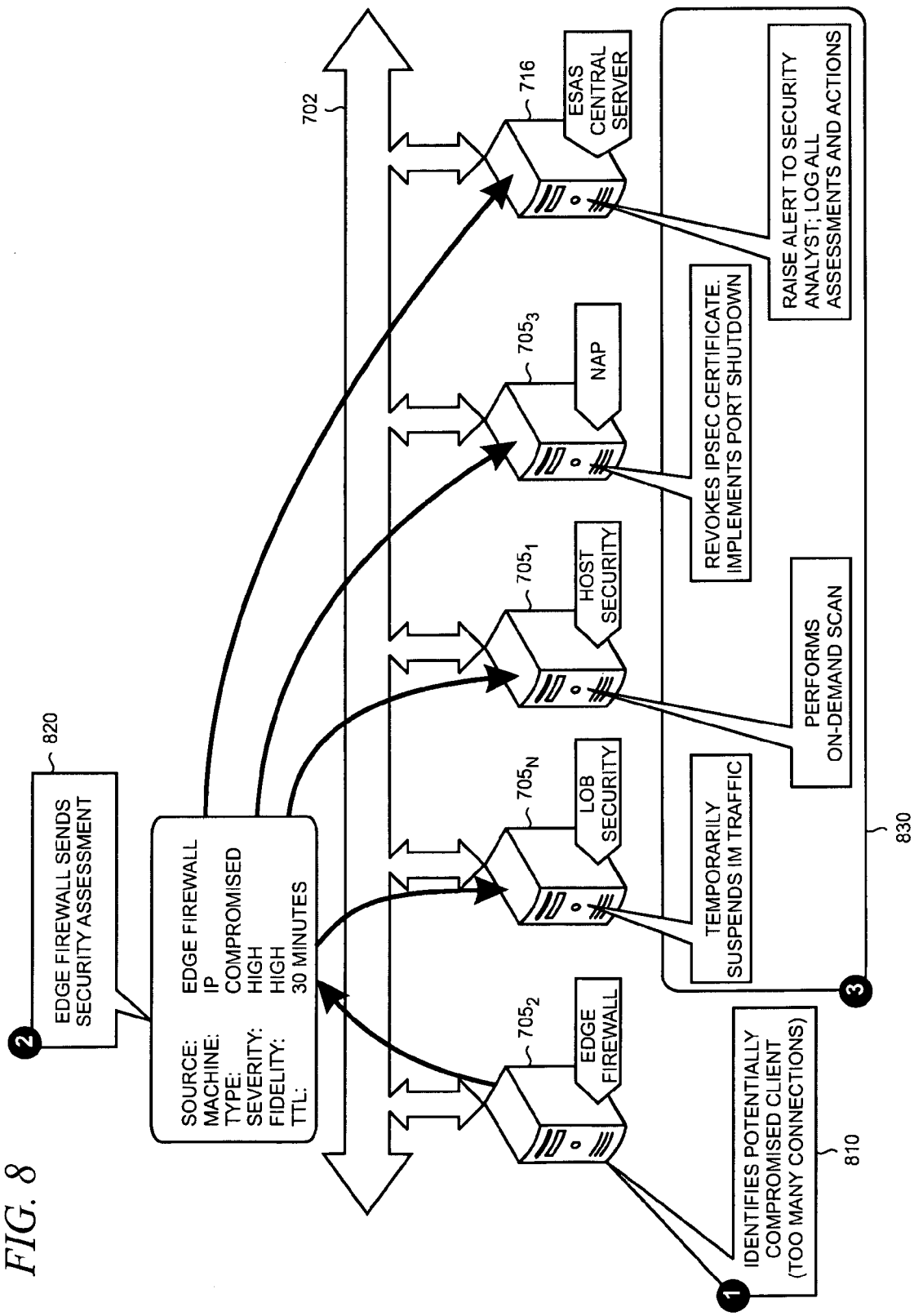
FIG. 8 is a diagram of a first illustrative scenario in which a plurality of ESAS-enabled endpoints are coupled to a security assessment channel and a detected incident at one endpoint triggers responses at multiple other endpoints.

FIG. 8 is a diagram of a first illustrative scenario in which a plurality of ESAS-enabled endpoints are coupled to the security assessment channel 702, and a detected incident at one endpoint triggers responses at multiple other endpoints. This illustrative scenario is described in three stages. As indicated by reference numeral 810, the edge firewall $705_2$ first identifies a potentially compromised client, for example, because it creates so many connections to the perimeter network that the most likely explanation for the behavior is the existence of a security compromise. Second, the edge firewall $705_2$ sends a security assessment that indicates the particular client is "compromised" with high severity and high fidelity, as indicated by reference numeral 820, over the security assessment channel 702 to subscribing endpoints.

Third, the subscribing endpoints $705_{1, 2, 3 \ldots N}$ and the ESAS central server 716 which receive the security assessment apply their specific security expertise through the application of their own correlation rules and locally-available data to trigger an appropriate action. As collectively indicated by reference numeral 830 in FIG. 8, the host security endpoint $705_1$ performs an on-demand scan. The NAP endpoint $705_3$ revokes the IP security certificate for the identified compromised client and implements a port shutdown. The line-of-business security endpoint $705_N$ temporarily suspends instant messaging ("IM") traffic to the compromised client based on the received security assessment. The ESAS central server 716 raises an alert for a security analyst (e.g., an administrator) and also logs all of the security assessments and actions invoked.

Figure 9:
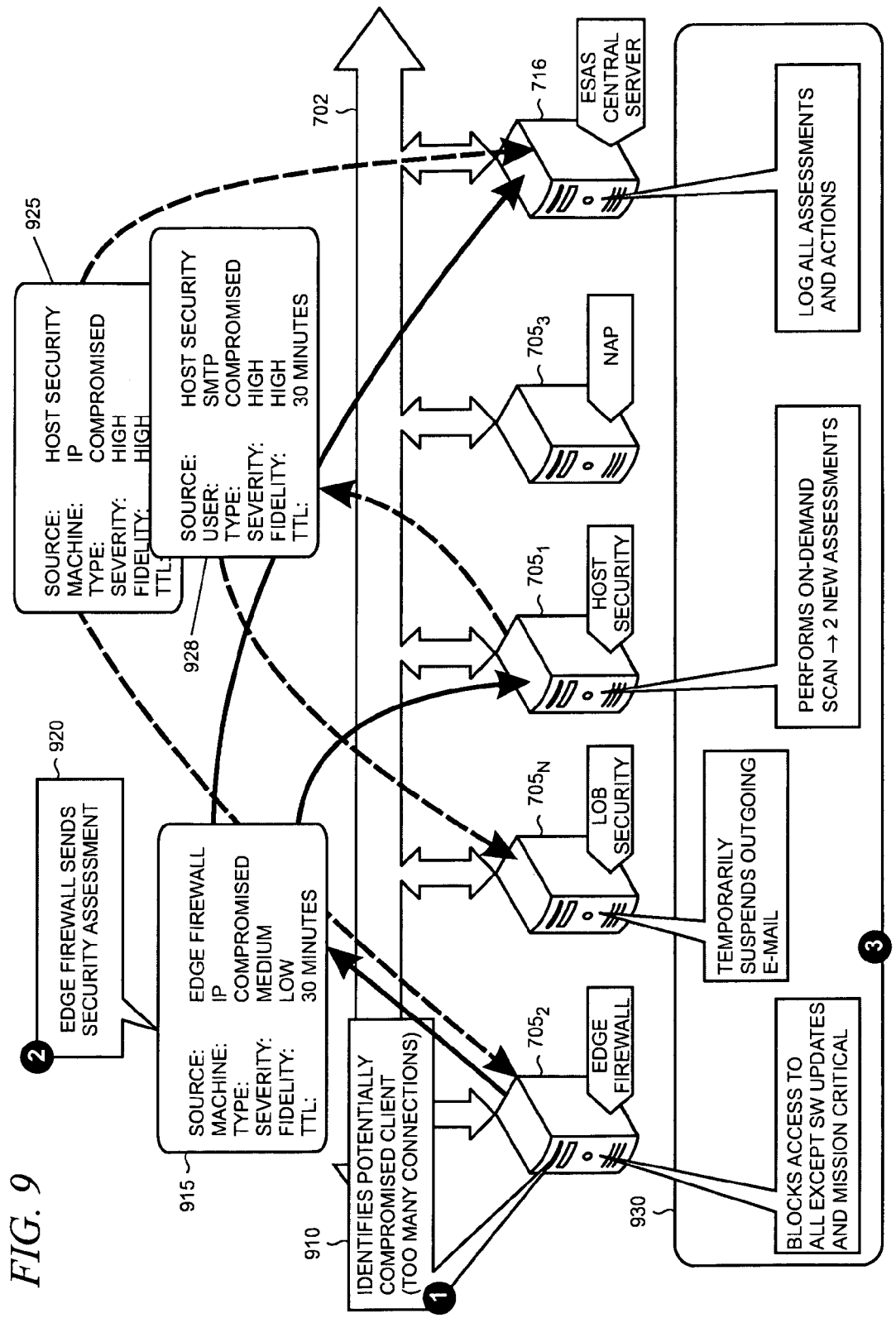
FIG. 9 is a diagram of a second illustrative scenario in which a low fidelity security assessment is sent over the security assessment channel that triggers the generation of a new high fidelity assessment by a receiving ESAS-enabled endpoint which also performs cross-object mapping.

The first illustrative scenario described above provides a case where the endpoint detecting the suspicious incident generates a security assessment with high severity and high fidelity (i.e., the endpoint has a high degree of confidence that it has validly detected a serious incident). By comparison, FIG. 9 is a diagram of a second illustrative scenario in which a low fidelity security assessment is sent over the security assessment channel 702 that triggers the generation of a high fidelity assessment by a receiving endpoint which also performs cross-object mapping.

This second illustrative scenario is also described in three stages. As indicated by reference numeral 910, the edge firewall $705_2$ first detects a large number of client connections to the perimeter network 112 (FIG. 1). However, unlike the first illustrative scenario shown in FIG. 8 and described in the accompanying text, the number of connections being established by the client is not so high that the edge firewall $705_2$ can be absolutely certain that the client has been compromised. In current enterprise security systems, when an endpoint sees such data it generally just drops the data and takes no action as there is not enough evidence to warrant the typically harsh response such as disconnecting the machine. By comparison, in the present scenario, the edge firewall $705_2$ in the second stage sends a security assessment 915 over the security assessment channel 702 that indicates that the particular client is compromised with medium severity and low fidelity, as indicated by reference numeral 920.

Here, the subscribing endpoints to the particular object referenced in the security assessment 915 generated by the edge firewall $705_2$ include the host security endpoint $705_1$ and the ESAS central server 716. While such a low fidelity data normally does not trigger an action to be taken at an endpoint in current security products, in accordance with the present enterprise security assessment sharing, the host security endpoint $705_1$ looks at its own local data differently in light of the received security assessment from the edge firewall $705_2$. In this case, the local data resulting from an on-demand scan at the host security endpoint $705_1$ and the information contained in the security assessment from the edge firewall $705_2$ are used to generate new assessments 925 and 928. Thus, the host security endpoint $705_1$ has information that, by itself, does not warrant the generation of a new security assessment, but when reinforced with even a low fidelity assessment from another endpoint, as in this case, there is sufficient evidence to justify the creation of the new security assessments 925 and 928 which each have high fidelity.

The host security endpoint $705_1$ places the new security assessments 925 and 928 onto the security assessment channel 702. The new security assessments 925 and 928 are received over the security assessment channel 702 by the subscribing endpoints which, in this illustrative scenario, include the edge firewall $705_2$, and the ESAS central server 716 for security assessment 925 and line-of-business endpoint $705_N$ for security assessment 928.

Note that the line-of-business endpoint $705_N$ was not a subscriber to the original security assessment 915 produced by the edge firewall $705_2$ because the reference object type is a machine and the line-of-business endpoint $705_N$, by virtue of its role in protecting e-mail, is typically concerned with the users. However, in this second illustrative scenario the host security endpoint $705_1$ maps from a host object type to a user object type when it generates a new security assessment 928. Such cross-object mapping capability may be beneficial in many scenarios as it is contemplated that a high severity incident, such as malware or malicious activity that potentially compromises the data confidentiality or integrity of a host computer, may also potentially compromise the user as well. A security assessment may be generated that cross-maps the high severity incident from the host object type to a user object type with a certain degree of fidelity. Similarly, a critical severity incident in which malware or malicious activity has actually caused a loss of data integrity on a host computer, a security assessment for a user object type may be generated with even higher fidelity.

In stage three, the new security assessments 925 and 928 trigger a variety of respective actions at the receiving endpoints, as collectively indicated by reference numeral 930. Specifically, the edge firewall $705_2$ blocks all access by the compromised client with the exception of software updates and/or mission-critical access. The line-of-business endpoint $705_N$ temporarily suspends outgoing e-mails. And, as with the first illustrative scenario, the ESAS central server 716 continues to log all assessments and actions. As noted above, such restrictions are enforced only during the period of time for which the TTL associated with the new security assessments 925 and 928 remains valid. When the new security assessments expire, the actions taken by the respective endpoints are rolled-back unless the TTL is extended or a new security assessment which invokes the restrictive actions is received.

Figure 10:
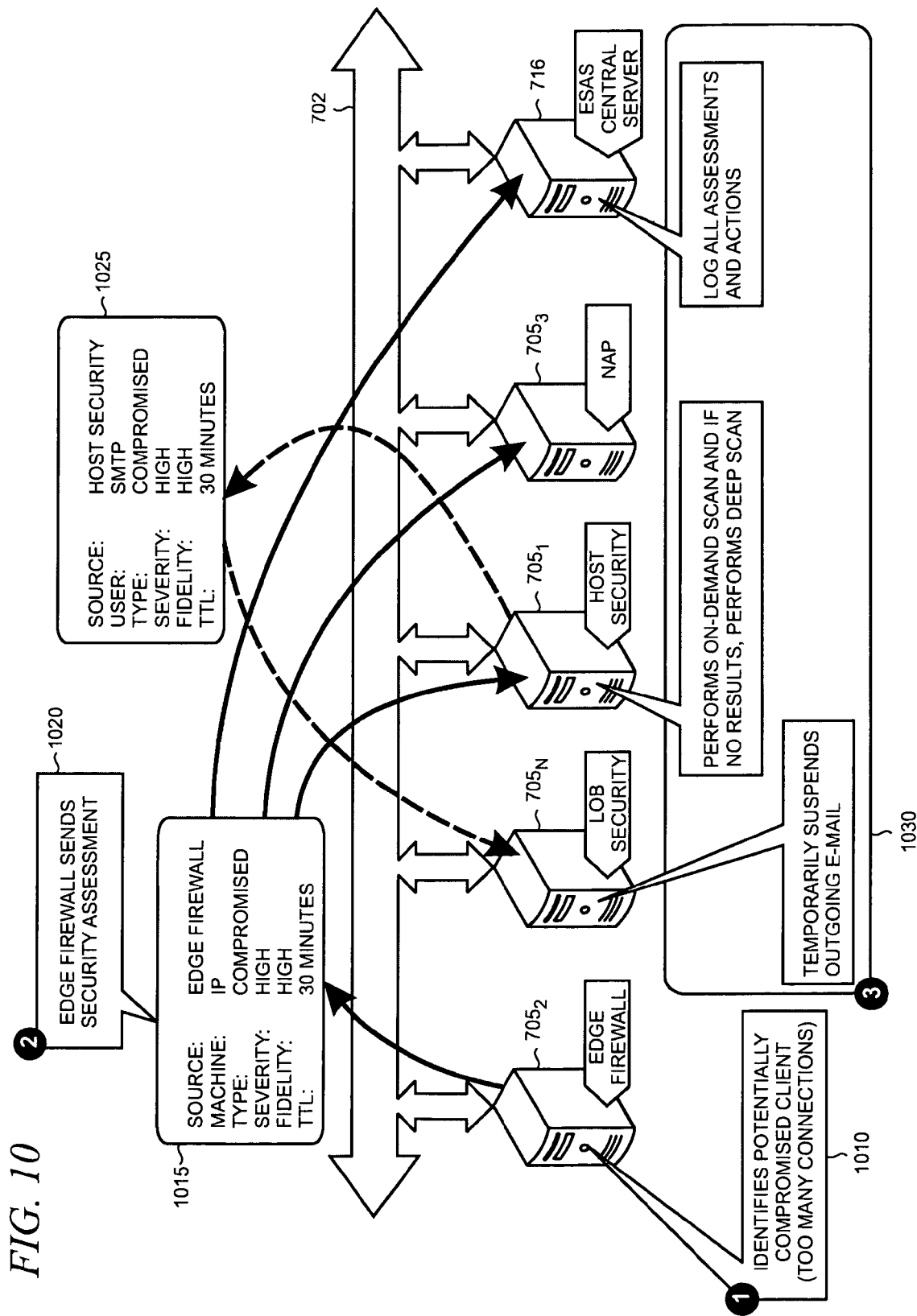
FIG. 10 is a diagram of a third illustrative scenario that shows the targeted use of remediation techniques.

FIG. 10 is a diagram of a third illustrative scenario that shows the targeted use of remediation techniques. This third illustrative scenario is described in three stages. As indicated by reference numeral 1010, the edge firewall $705_2$ first detects a large number of client connections to the perimeter network. Second, the edge firewall $705_2$ sends a security assessment 1015 that indicates the particular client is "compromised" with high severity and high fidelity, as indicated by reference numeral 1020, over the security channel 702 to subscribing endpoints. The subscribing endpoints include the host security endpoint $705_1$ the NAP endpoint $705_3$ and the ESAS central server 716.

The host security endpoint $705_1$ reviews the received security assessment and applies its specific security expertise using correlation rules and any relevant locally-available data. In this illustrative example, the host security endpoint $705_1$ responsively generates a new security assessment 1025 containing a user object type to which the line-of-business security endpoint $705_N$ subscribes.

In the third stage of the scenario, the remediation techniques employed by the endpoints are considered expensive in terms of their potential impact on business operations within the enterprise environment 100 (FIG. 1). For example, as indicated by reference numeral 1030, the line-of-business security endpoint $705_N$ implements a response policy that entails temporarily suspending outgoing e-mail. In addition, the host security endpoint $705_1$ performs an on-demand scan and if no results are achieved, performs a deep scan. While such remediation techniques can be very effective in addressing malware, malicious users, and other problems, they typically impart significant expense to the enterprise. For example a user whose outgoing e-mail is suspended will be less productive, and deep scanning typically requires one or more reboots which will remove the machine from service for a period of time.

The ESAS arrangement advantageously enables these effective, albeit expensive, remediation techniques to be applied in a targeted manner and not merely in a general way or across-the-board which can be unjustified for some machines and/or users. Only objects in the environment that are deemed suspicious, using pre-defined criteria, will be subject to these particular remediation techniques.

Figure 11:
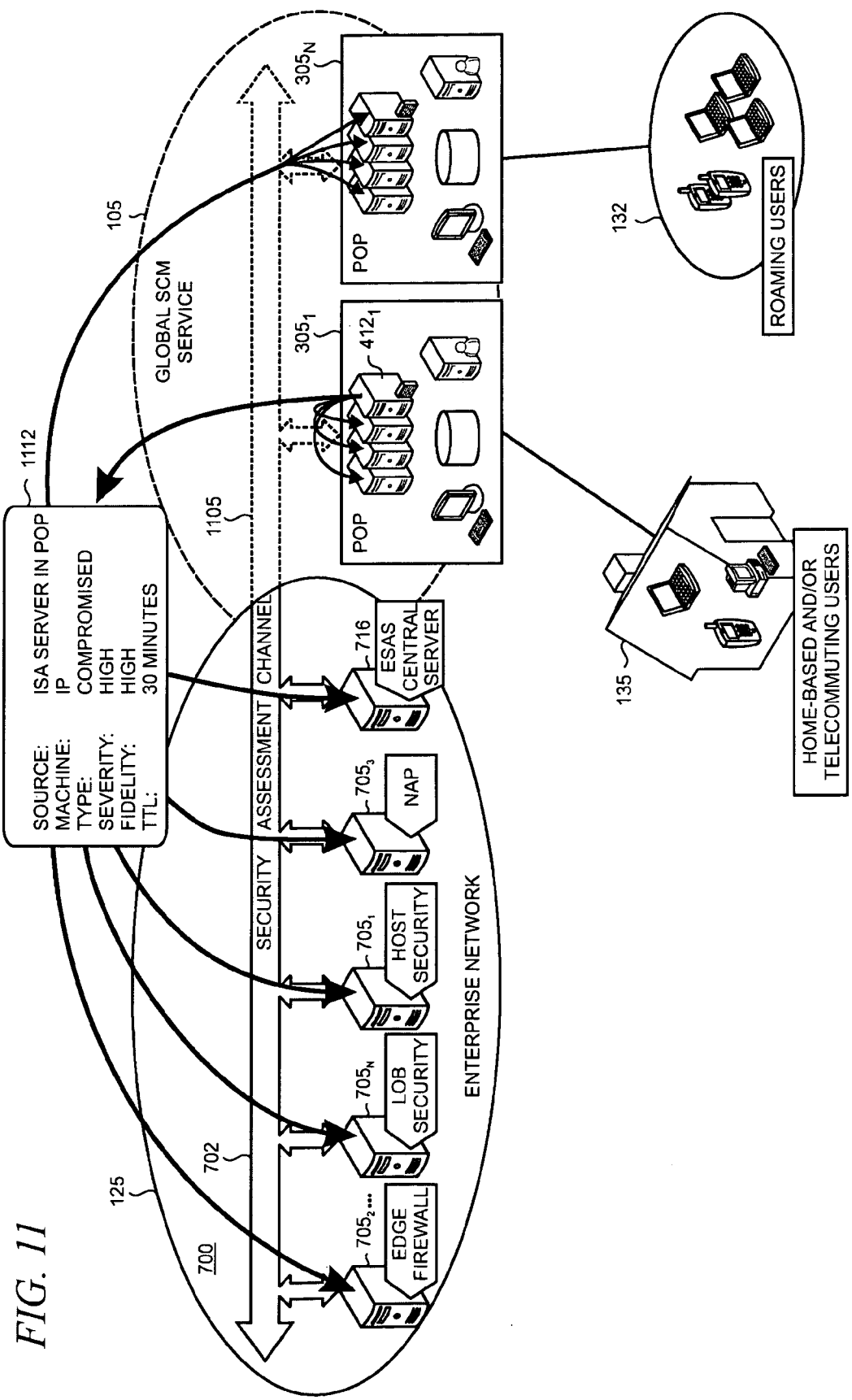
FIG. 11 shows an illustrative arrangement in which an ESAS security assessment channel may be extended from an enterprise network using the global SCM service.

As shown in FIG. 11, the global SCM service 105 may be advantageously utilized to optionally extend and expand the ESAS security channel 702 shown in FIGS. 7-10 and described in the accompanying text. In particular, the security assessment channel may be extended into the Internet cloud to couple to security endpoints (i.e., security products) that are located in the POPs 305 as indicated by reference numeral 1105. While FIG. 11 shows the POPs $305_{1...N}$ being coupled to the extended ESAS security channel 1105, there is no requirement that each and every POP used in a particular implementation of the global SCM service 105 be so coupled. In addition, it may also be possible to use a dedicated ESAS security channel that is not an extension from an existing ESAS security channel in an enterprise.

The global SCM service 105 enables the extension of ESAS to include security assessments to be both sent and received by security endpoints that are located in the POPs 305. The enhanced security that ESAS provides can thus be applied to the enterprise's IT assets that are located outside the perimeter of the enterprise network 125 including the home-based and/or telecommuting users 135 and roaming users 132. In addition, the ESAS system itself may be enhanced by increasing the number of deployed sensors that are available to detect potential security threats.

In this illustrative example, the ISA server $412_1$ in POP $305_1$ generates a security assessment 1112 when it detects, for example, a potentially compromised laptop being operated by one of the roaming users 132. The security assessment 1112 indicates that the laptop is "compromised" with high severity and high fidelity with a TTL value of 30 minutes. The security assessment is published into the extended ESAS security assessment channel 1105 and received by the subscribing endpoints including endpoints 705 and the ESAS central server 716 in the enterprise network 125, as well as those in other POPs as indicated by the arrows in FIG. 11. The security assessment 1112 will also typically be shared locally among endpoints in the POP $305_1$ over a locally deployed security assessment channel as shown in more detail in FIG. 13 and described in the accompanying text. Endpoints receiving the security assessment 1112 will take responsive local actions, perform cross-object mapping, implement targeted remediation, etc. as described above in the text accompanying FIGS. 7-10, according to local response policies.

Figure 12:
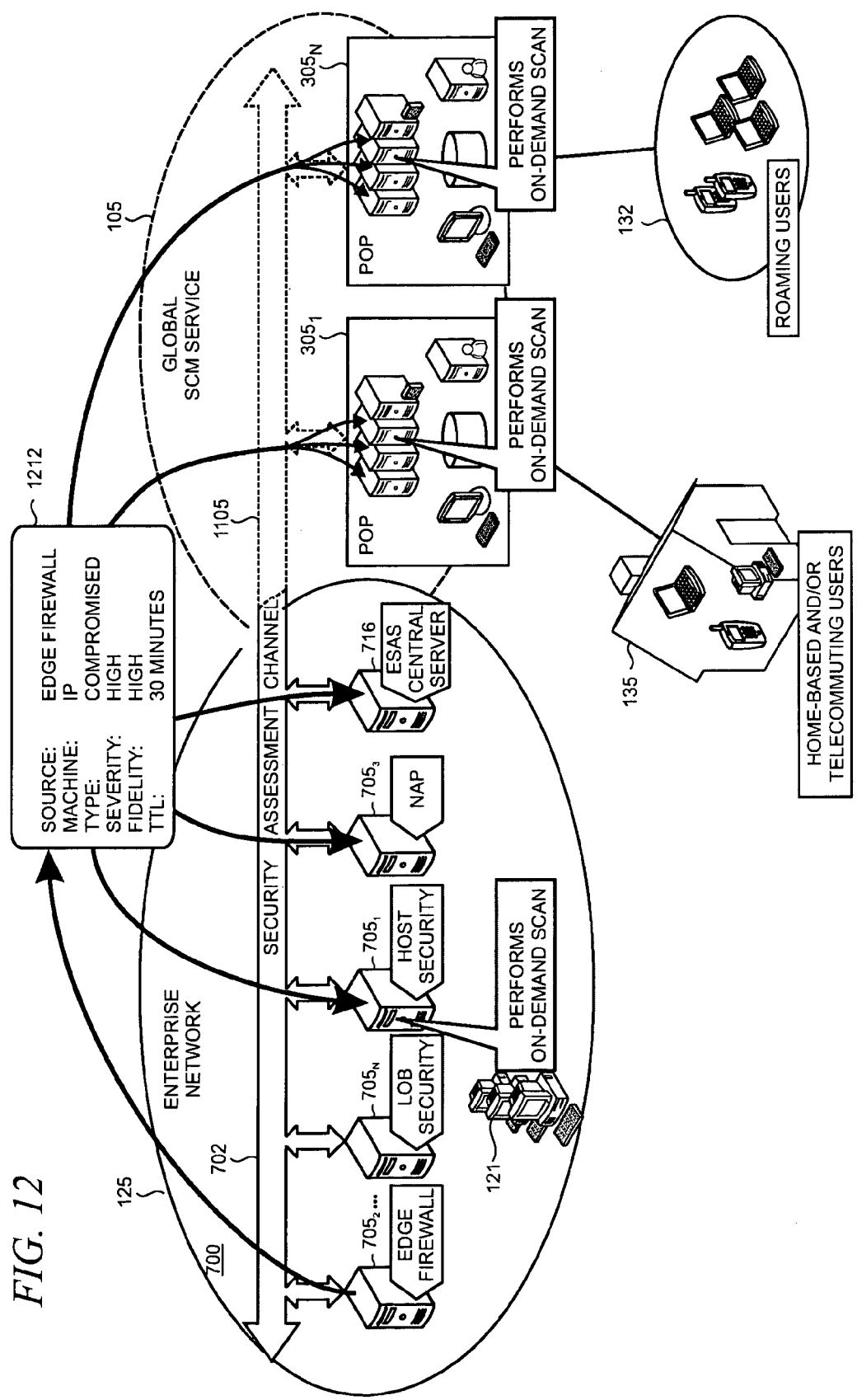
FIG. 12 shows an illustrative extended ESAS architecture in which a local action is triggered in a POP in the global SCM service in response to a security assessment that is generated by an endpoint in the enterprise network.

As shown in FIG. 12, endpoints in POPs 305 may use the extended ESAS security channel 1105 to subscribe to, and receive security assessments that are generated by security endpoints 705 in the enterprise network 125. Here, an illustrative security assessment 1212 is generated by the edge firewall $705_2$ when a security incident affecting a computer in the enterprise network 125 is detected. The security assessment 1212 indicates that the computer is "compromised" with high severity and high fidelity with a TTL value of 30 minutes.

Subscribing endpoints in the enterprise network 125 and in the POPs 305 receive the security assessment 1212 from the security assessment channel 702, as extended by the global SCM service 105. In this example, in accordance with response policies, the host security products in the enterprise network 125 and POPs 305 perform on-demand scans of the IT assets respectively used by users 121 in the enterprise network 125, the home-based and/or telecommuting users 135, and the roaming users 132.

Figure 13:
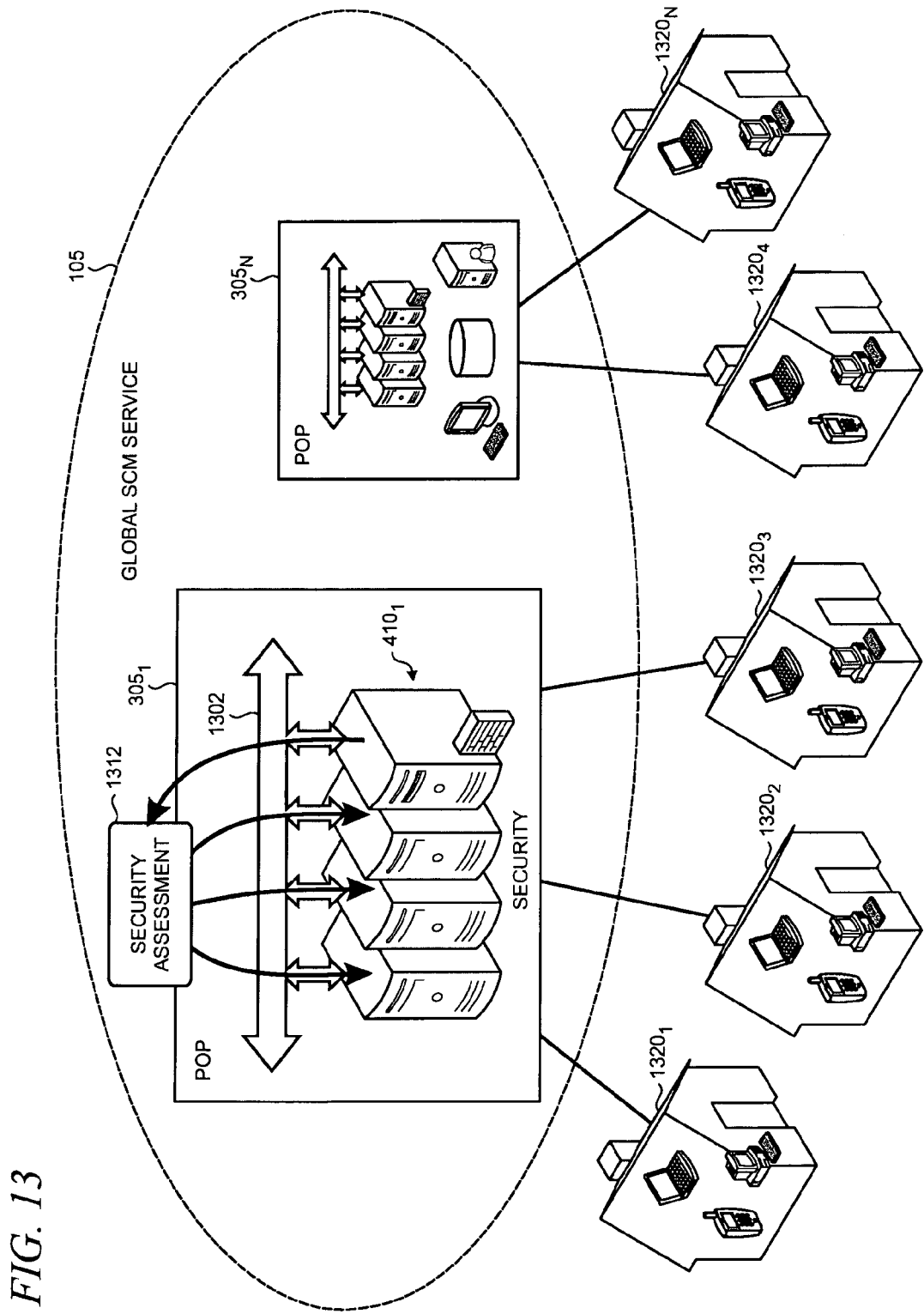
FIG. 13 shows an illustrative arrangement in which an ESAS architecture is locally implemented in one or more of the POPs in the global SCM service.

FIG. 13 shows an illustrative arrangement in which an ESAS architecture is locally implemented in several POPs 305 in the global SCM service 105. A security assessment sharing channel 1302 enables security assessments, such as an illustrative security assessment 1312, to be generated and shared by security products 410 (called "endpoints" in an ESAS context) according to the ESAS publish and subscribe model described above.

In addition to being usable to complement the extended ESAS functionality described above in the text accompanying FIGS. 11 and 12, the local ESAS arrangement may be used independently of ESAS implementations used in an enterprise network environment. For example, as shown in FIG. 13, multiple households or groups of consumer users $1320_{1, 2...N}$ are connected to the global SCM service 105. Each household 1320 can take advantage of ESAS by virtue of the comprehensive suite of security products in the POP 305 and the widespread distribution of sensors for detecting security incidents that accompanies the global scale of the SCM service.

As the global SCM infrastructure is shared among the consumer user groups 1320, and the individual households can be aggregated as ESAS clients, consumers gain the benefit of improved security incident detection and handling in a cost-effective manner. For example, a security incident detected affecting an IT device in one household $1320_1$ can trigger a scan of IT devices in a second household $1320_2$. Without the aggregation provided through the global SCM service 105 and the benefits of ESAS it allows, the IT devices in the second household might otherwise be vulnerable.

In some implementations where an ESAS architecture is locally implemented in one or more POPs 305 in the global SCM service 105, security assessments and local responses can take into account such factors or characteristics, for example, as demographics, user-profile, Internet use habits, or user-preferences. Such factors may provide additional security context or affect how a particular local response is implemented to enhance the quality of the security protection for the consumer. In addition, consumers having similar characteristics may be grouped for purposes of security assessment generation and sharing so that security detection and responses are well tailored to meet particular consumer needs. Use of such factors or characteristics is optional. When utilized, the consumer may be informed that some data about the user will be collected for the purposes of enhancing security and the consumer is given the opportunity to provide consent before any data is collected.

Figure 14:
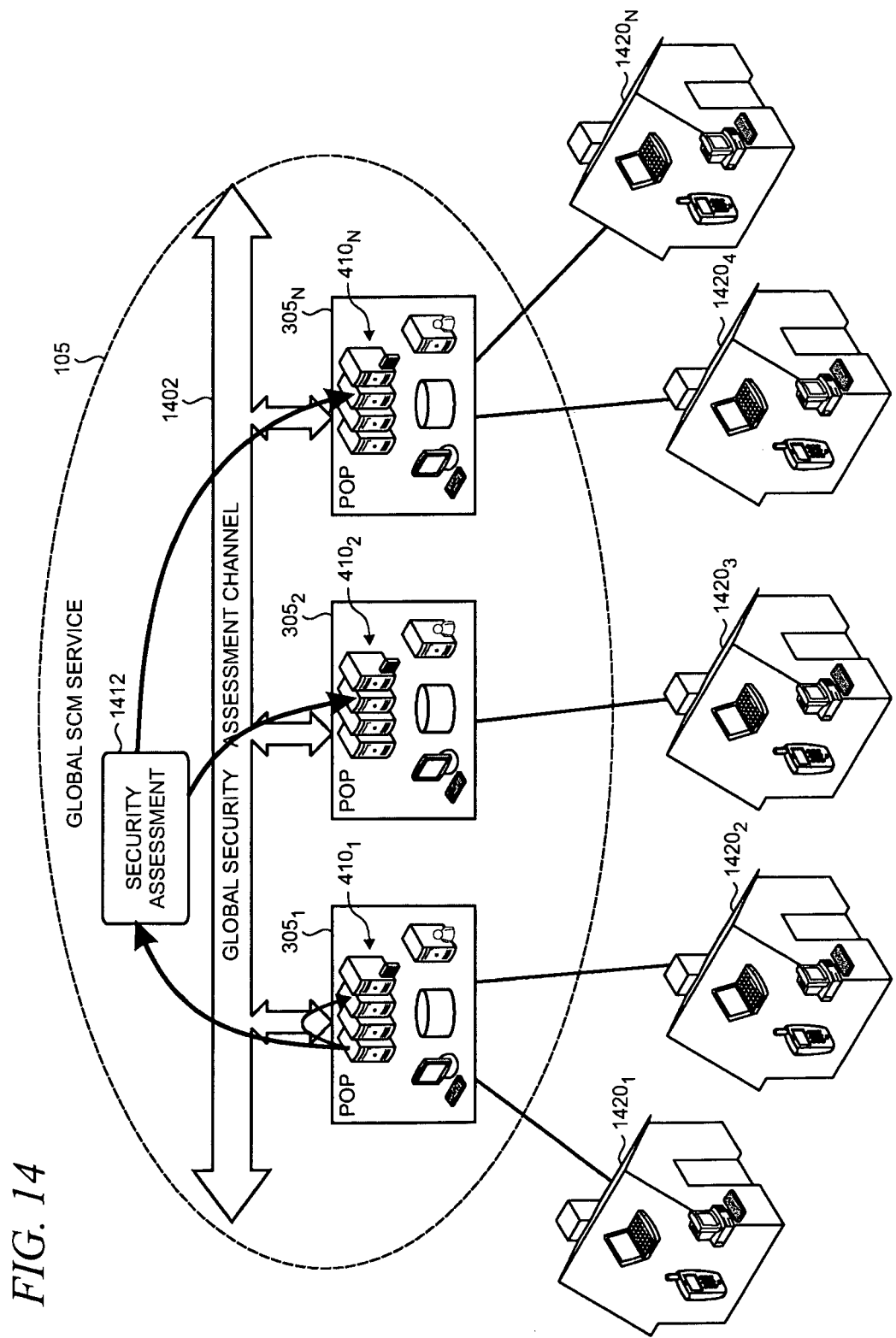
FIG. 14 shows an illustrative arrangement in which an ESAS global security assessment channel is implemented among POPs in the global SCM service.

The ESAS architecture that is locally implemented in a POP as shown in FIG. 13 may also be extended to other POPs in the global SCM service 105, as shown in FIG. 14. In this illustrative example, a global security assessment channel 1402 is established between two or more POPs 305. Security assessments, such as an illustrative security assessment 1412, may be generated and shared among security endpoints 410 in different POPs 305. Utilization of security assessments over the global security assessment channel 1402 enables ESAS to be distributed among users $1420_{1, 2 \ldots N}$ over larger geographic area than is served by a single POP 305.

Figure 15:
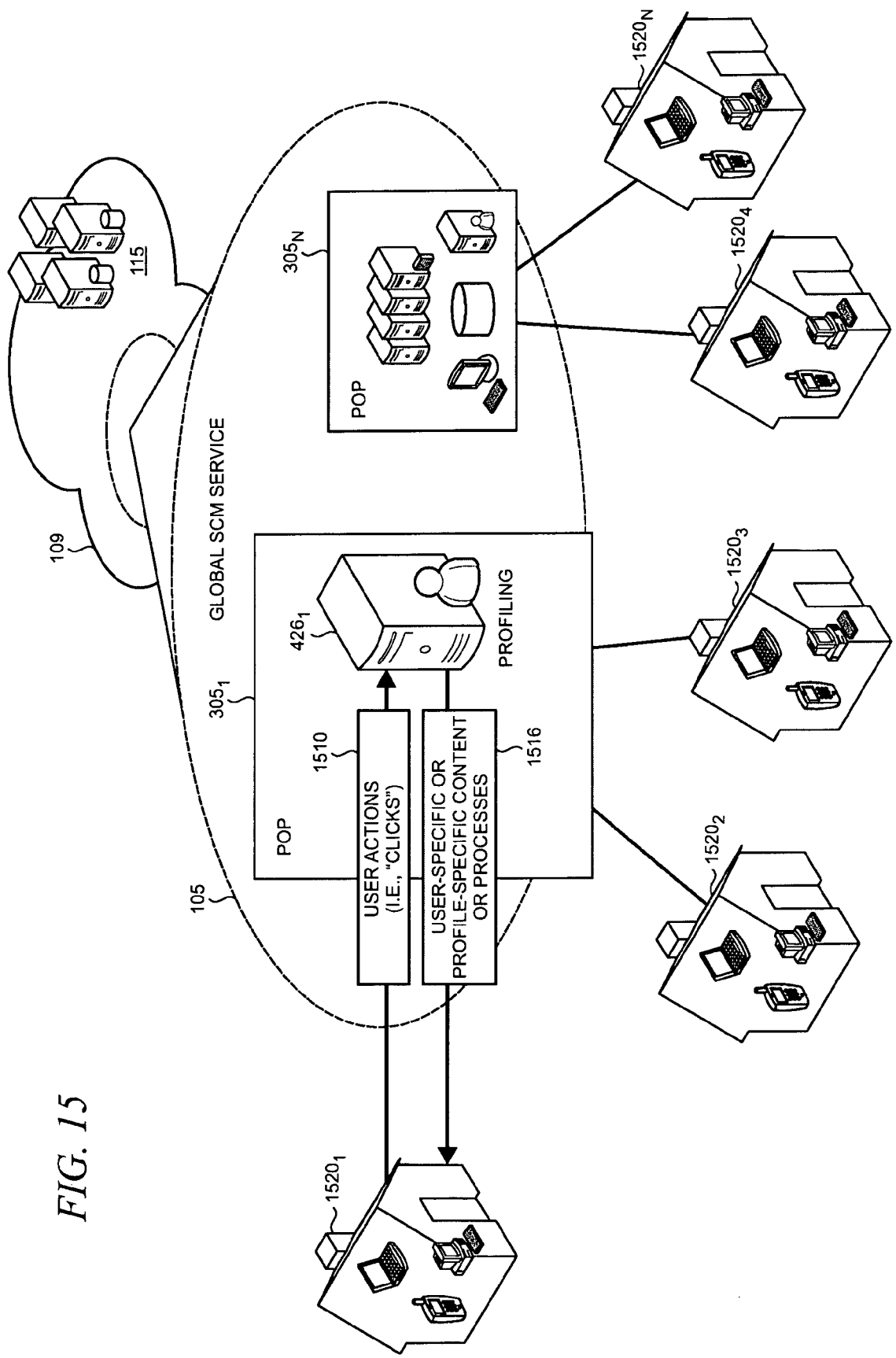
FIG. 15 shows an illustrative arrangement in which the global SCM service implements a profiling functionality where user-specific or profile-specific content is provided.

FIG. 15 shows an illustrative arrangement in which the global SCM service 105 implements a profiling functionality 426 in one or more POPs 305 where user-specific or profile-specific content or processes are provided to users $1520_{1, 2 \ldots N}$. The profiling functionality may be implemented as a complement to the security features described above, or in some applications be used independently or in combination with other features or services (such as Internet or web searching, for example). The profiling functionality 426 is offered as an optional feature that may be selected by a user. The user is informed that user actions may be being monitored for the purposes of enhancing the quality of the user experience and the user is given the opportunity to provide consent before any monitoring is performed.

In this example, the user accesses and interacts with cloud-based resources 115 through the global SCM service 105 as described above. Because each interaction or "click" may be monitored by the global SCM service 105 through the POP 305 as indicated by reference numeral 1510, a user-profile for users of the service may be generated and stored. User-specific or profile-specific content may be responsively generated and provided to the user, as indicated by reference numeral 1516, to increase the relevancy of the content to the user. Such content and processes may include, for example, targeted advertising and search results, advanced caching such as pre-fetching on a personalized/user-profile basis, or personalized web-based experiences. By having the ability to see every user click on the Internet, more accurate user-profiles can be generated so that the provided content or processes are better suited to the specific user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An ESAS (enterprise security assessment sharing) architecture arranged to support sharing of security assessments pertaining to an off-premise security object, comprising:
    an SCM (Secure Content Management) security assessment channel that is implemented in a POP (Point-of-Presence) that is utilized with an SCM service, the SCM service a) implementing security monitoring of interactions between authenticated users and resources accessed over an Internet connection, the security monitoring including bidirectional content filtering between the authenticated users' IT devices and resource servers, the bidirectional content filtering being implemented subsequent to a user being authenticated, and the security monitoring further including anti-virus protection and intrusion detection, and b) content caching based on a profile of a user, the user profile being generated responsively to the monitored interactions, the SCM security assessment channel being arranged to extend an enterprise network security assessment channel from an IT device network into the POP, the POP including at least a forward proxy server for forwarding traffic from the off-premise security object to a resource server over the Internet connection; and
    a plurality of endpoints disposed in the POP, each of the endpoints having a capability to publish and receive security assessments respectively into and from the SCM security assessment channel, the security assessment being usable for describing a security incident pertaining to the off-premise security object using a semantic abstraction of security-related information that is available to an endpoint, the semantic abstraction i) being categorized by type, and ii) being utilizable by one or more of the endpoints to trigger a response to the security incident.

2. The ESAS architecture of claim 1 further including a global security assessment channel arranged between multiple POPs associated with the SCM service, the global security assessment channel being configured to transport security assessments among the POPs.

3. The ESAS architecture of claim 1 in which the IT device network is an enterprise network and the off-premise security object comprises an off-premise user or an off-premise IT device.

4. The ESAS architecture of claim 1 in which the plurality of endpoints includes at least one of edge firewall, host security gateway product, NIDs (Network Intrusion Detection System) security product, NAP (Network Access Protection) security product, SEM product (Security Event Management), SIM product (Security Incident Management), UTM (Unified Threat Management) product, operational health monitoring product, configuration management product, anti-virus product, anti-spyware product, anti-malware product, information leakage prevention product, or anti-spam product.

5. The ESAS architecture of claim 1 in which a security assessment is arranged for providing an assignment of context by an endpoint to the security-related information using a pre-defined taxonomy.

6. The ESAS architecture of claim 5 in which the pre-defined taxonomy utilizes a schematized vocabulary comprising object types and assessment categories.

7. The ESAS architecture of claim 6 in which the object types include at least one of host, user, service, data, or enterprise.

8. The ESAS architecture of claim 6 in which the assessment categories include at least one of vulnerable, compromised, under attack, of interest, corrupted, or malicious.

9. The ESAS architecture of claim 8 in which particular ones of assessment categories are mapped to particular ones of object types.

10. The ESAS architecture of claim 1 in which the security assessment comprises a plurality of fields, at least one of which is a fidelity field that is arranged to express a degree of confidence an endpoint has in the security assessment.

11. The ESAS architecture of claim 1 further including a hub operatively coupled to one or more POPs, the hub providing configuration management for forward proxy servers, and further providing identity management to authenticate and authorize a user of the IT device.

12. The ESAS architecture of claim 11 further including response policies that are disposed in a database located in either a POP or the hub, the response policies describing an action to be taken by a security endpoint in response to a received security assessment.

13. A method for sharing security-related data about an off-premise object, the method comprising the steps of:

generating a security assessment at a first endpoint, published to a security assessment channel, to describe a security incident relating to the off-premise object, the generating being based at least in part on locally-available information at the first endpoint, the security assessment being arranged to provide contextual meaning to the security incident and being defined with a time interval over which the security assessment is valid;

receiving a current security assessment at the first endpoint, from the security assessment channel, in accordance with a subscription to a subset of available security assessments generated by other endpoints that are configured to monitor either one or more objects within a premise of an enterprise network or one or more off-premise objects that access resources through an SCM (Secure Content Management) service supported by an infrastructure including a plurality of POPs (Points-of-Presence), the SCM service a) implementing security monitoring of interactions between authenticated users and resources accessed over an Internet connection, the security monitoring including bidirectional content filtering between the authenticated users' IT devices and resource servers, the bidirectional content filtering being implemented subsequent to a user being authenticated, and the security monitoring further including anti-virus protection and intrusion detection, and b) content caching based on a profile of a user, the user profile being generated responsively to the monitored interactions, each POP in the plurality including at least a forward proxy server for forwarding traffic to the resource servers over the Internet connection; and performing an action at the first endpoint in accordance with a response policy in response to the received security assessment.

14. The method of claim 13 in which the off-premise object is one of a user or IT device.

15. The method of claim 13 in which the locally-available information comprises one or more previously received security assessments from the subset so long as the previous security assessments are valid.

16. The method of claim 13 in which the locally-available information further comprises one or more past local actions taken by the endpoint.

17. The method of claim 13 including a further step of rolling back the local action once the received security assessment is no longer valid.

18. A method for providing an ESAS (enterprise security assessment sharing) service for an off-premise user or IT device, the method comprising the steps of:

utilizing an infrastructure that is accessible by the off-premise user over an Internet connection, the infrastructure including a plurality of POPs (Points-of-Presence), each POP in the plurality including i) a forward proxy server for forwarding traffic from the off-premise user or IT device to resource servers that are accessible from the Internet, and ii) one or more endpoints, each endpoint being arranged to provide a security product or security service having applicability to the off-premise user or IT device, the infrastructure supporting a Secure Content Management (SCM) service, the SCM service a) implementing security monitoring of interactions between authenticated users and resources accessed over an Internet connection, the security monitoring including bidirectional content filtering between the authenticated users' IT devices and the resource servers, the bidirectional content filtering being implemented subsequent to a user being authenticated, and the security monitoring further including anti-virus protection and intrusion detection, and b) content caching based on a profile of a user, the user profile being generated responsively to the monitored interactions;

providing a security assessment channel in the infrastructure, the security assessment channel being configured for communicating a security assessment using a publish and subscribe model by which a publishing endpoint publishes the security assessment to which a subscribing endpoint subscribes according to a subscription, the security assessment using a pre-defined taxonomy to provide contextual meaning to a security incident involving the off-premise user or IT device; and directing the off-premise user or IT device to a co-located POP, a POP being co-located when a set of parameters is optimized including network latency compared with non-co-located POPs and localization of a user experience may be implemented.

19. The method of claim 18 in which the security assessment is defined by at least one of security assessment fidelity, time-to-live, or security incident severity.

20. The method of claim 18 including a further step of performing network optimization in a POP, the network optimization including one of caching, HTTP compression, or QoS enforcement.

* * * * *